(12) United States Patent
Schwartz et al.

(10) Patent No.: US 9,627,903 B2
(45) Date of Patent: *Apr. 18, 2017

(54) CURRENT SENSING CIRCUIT DISCONNECT DEVICE AND METHOD

(71) Applicant: Robert M. Schwartz, Miami, FL (US)

(72) Inventors: Robert M. Schwartz, Miami, FL (US); Peter M. Hockman, Miami, FL (US); Gregg M. Connary, Boynton Beach, FL (US); Richard A. Berkowitz, Miami, FL (US)

(*) Notice: Subject to any disclaimer, the term of this patent is extended or adjusted under 35 U.S.C. 154(b) by 732 days.

This patent is subject to a terminal disclaimer.

(21) Appl. No.: 13/908,217

(22) Filed: Jun. 3, 2013

(65) Prior Publication Data

US 2013/0300348 A1    Nov. 14, 2013

Related U.S. Application Data

(63) Continuation-in-part of application No. 13/892,509, filed on May 13, 2013, now Pat. No. 9,035,604, which is a continuation-in-part of application No. 12/843,151, filed on Jul. 26, 2010, now Pat. No. 8,456,137.

(60) Provisional application No. 61/228,213, filed on Jul. 24, 2009, provisional application No. 61/825,164, filed on May 20, 2013.

(51) Int. Cl.
*H02J 7/00*  (2006.01)
*H02J 9/00*  (2006.01)
*H02J 7/02*  (2016.01)

(52) U.S. Cl.
CPC ............ *H02J 7/0052* (2013.01); *H02J 9/005* (2013.01); *H02J 7/0042* (2013.01); *H02J 7/02* (2013.01); *H02J 2009/007* (2013.01)

(58) Field of Classification Search
CPC ..................................................... H02J 7/0052
USPC .................................................. 320/107, 108
See application file for complete search history.

(56) References Cited

U.S. PATENT DOCUMENTS

| | | | |
|---|---|---|---|
| 2,706,225 A | 4/1955 | Freeman | |
| 2,885,623 A | 5/1959 | Staufenberg | |
| 4,070,699 A * | 1/1978 | Einbinder | ......... H02M 3/33507 361/86 |
| 4,482,789 A | 11/1984 | McVey | |

(Continued)

FOREIGN PATENT DOCUMENTS

| | | |
|---|---|---|
| EP | 1122872 | 8/2001 |
| EP | 1473813 | 11/2004 |

(Continued)

*Primary Examiner* — M'Baye Diao
(74) *Attorney, Agent, or Firm* — Robert M. Schwartz; Kerry P. Sisselman

(57) ABSTRACT

A device and method are provided for saving power and electricity in a charging device including external power supplies and battery chargers having a primary circuit and a secondary circuit where a switch is located in the primary circuit and a current sensing device in the secondary circuit to sense when there is a drop in current in the secondary circuit or no current in the secondary circuit because the load such as a cell phone or tablet is charged and when this occurs the switch in the primary circuit is opened and the primary circuit no longer draws power from the source of power until the switch in the primary circuit is closed by activation of a user of the charging device.

14 Claims, 18 Drawing Sheets

(56) References Cited

U.S. PATENT DOCUMENTS

| | | |
|---|---|---|
| 4,544,909 A | 10/1985 | Di Nunzio |
| 5,550,437 A * | 8/1996 | Hopkins ............ H05B 41/2921 315/209 R |
| 5,760,491 A | 6/1998 | Kalin |
| 6,028,413 A | 2/2000 | Brockmann |
| 6,204,637 B1 | 3/2001 | Rengan |
| 6,316,844 B1 | 11/2001 | Arima |
| 6,339,314 B1 | 1/2002 | Bruning |
| 6,489,725 B1 | 12/2002 | Suzuki et al. |
| 6,509,658 B1 | 1/2003 | Kim |
| 6,586,849 B2 | 7/2003 | Tarr |
| 6,671,814 B1 | 12/2003 | Kubo |
| 6,777,828 B1 | 8/2004 | Rothstein |
| 6,874,093 B2 | 3/2005 | Bell |
| 6,895,516 B2 | 5/2005 | Odaohhara |
| 6,986,067 B2 | 1/2006 | Odaohhara |
| 7,132,763 B2 | 11/2006 | Rendic |
| 7,184,258 B2 | 2/2007 | Lai |
| 7,224,086 B2 | 5/2007 | Germagian et al. |
| D587,192 S | 2/2009 | McGinley et al. |
| D587,193 S | 2/2009 | McGinley et al. |
| 7,516,343 B2 | 4/2009 | Bhogal |
| 7,560,907 B2 | 7/2009 | Nelson |
| 7,597,570 B2 | 10/2009 | So |
| 7,635,273 B2 | 12/2009 | Buzil |
| D611,416 S | 3/2010 | McGinley et al. |
| 7,800,351 B2 | 9/2010 | Gan |
| 7,910,833 B2 | 3/2011 | McGinley et al. |
| 7,910,834 B2 | 3/2011 | McGinley et al. |
| 7,923,869 B2 | 4/2011 | Bagenholm |
| 7,960,648 B2 | 6/2011 | McGinley et al. |
| 8,242,359 B2 | 8/2012 | McGinley et al. |
| 2004/0056533 A1 | 3/2004 | Chen |
| 2005/0041360 A1 | 2/2005 | Dettweiler |
| 2005/0237036 A1 | 10/2005 | Nguyen et al. |
| 2006/0202557 A1 | 9/2006 | Menas et al. |
| 2006/0292905 A1 | 12/2006 | Gilliland |
| 2007/0047270 A1 | 3/2007 | Makino |
| 2007/0141894 A1 | 6/2007 | McGinley et al. |
| 2007/0164704 A1 | 7/2007 | McGinley |
| 2007/0300089 A1 | 12/2007 | Bhogal |
| 2008/0059816 A1 | 3/2008 | Paniagua |
| 2008/0130340 A1 | 6/2008 | Unger et al. |
| 2008/0222431 A1 | 9/2008 | Paniagua |
| 2009/0027922 A1 | 1/2009 | Tracy et al. |
| 2009/0177906 A1 | 7/2009 | Paniagua |
| 2009/0289596 A1 | 11/2009 | McGinley et al. |
| 2009/0295233 A1 | 12/2009 | McGinley et al. |
| 2010/0001685 A1 | 1/2010 | Eastlack |
| 2010/0041262 A1 | 2/2010 | Chesneau |
| 2010/0225273 A1 | 9/2010 | Eastlack |
| 2011/0050170 A1 | 3/2011 | Eastlack |
| 2011/0260555 A1 | 10/2011 | McGinley et al. |
| 2012/0062182 A1 | 3/2012 | Rimdzius et al. |
| 2012/0326502 A1 | 12/2012 | Nguyen et al. |
| 2013/0187596 A1 | 7/2013 | Eastlack |
| 2013/0187597 A1 | 7/2013 | Eastlack |

FOREIGN PATENT DOCUMENTS

| | | |
|---|---|---|
| EP | 1513255 | 3/2005 |
| GB | 2438655 | 12/2007 |
| JP | 4-165957 | 6/1992 |
| WO | 88/06814 | 9/1988 |
| WO | 2007/027063 | 3/2007 |
| WO | 2008/062174 | 5/2008 |
| WO | 2011/129995 | 10/2011 |

* cited by examiner

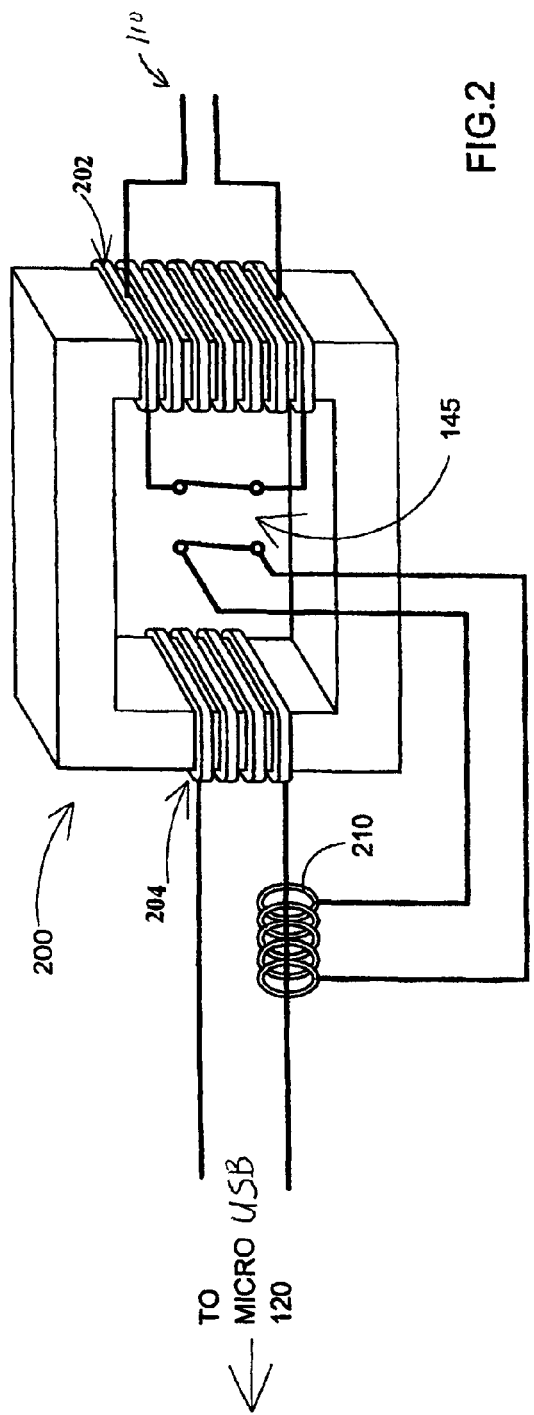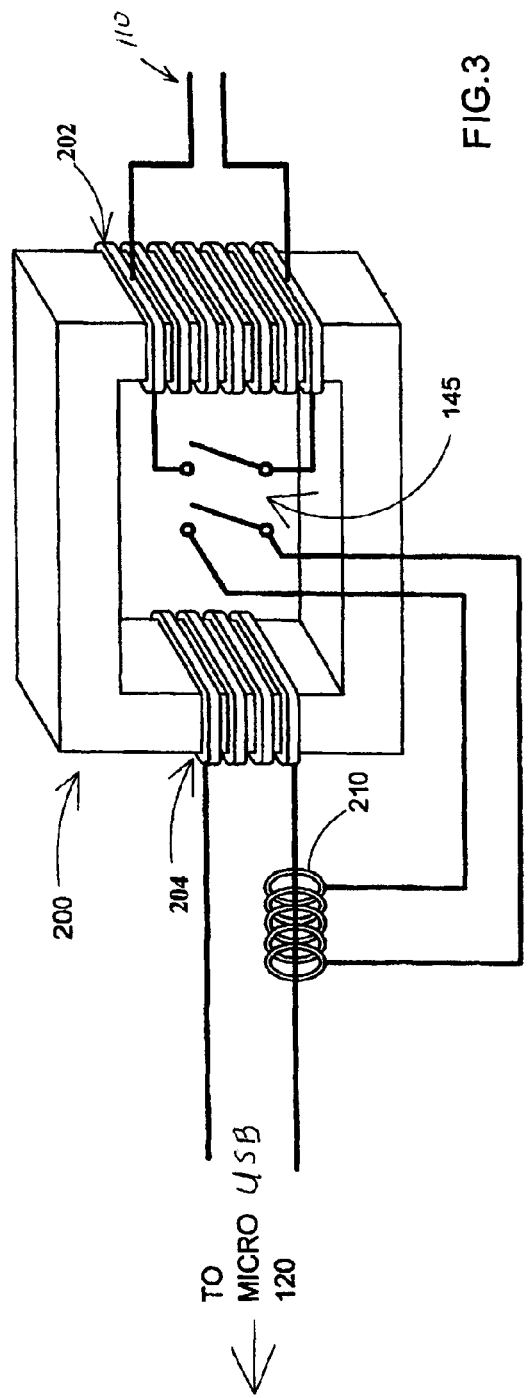
FIG.2
FIG.3

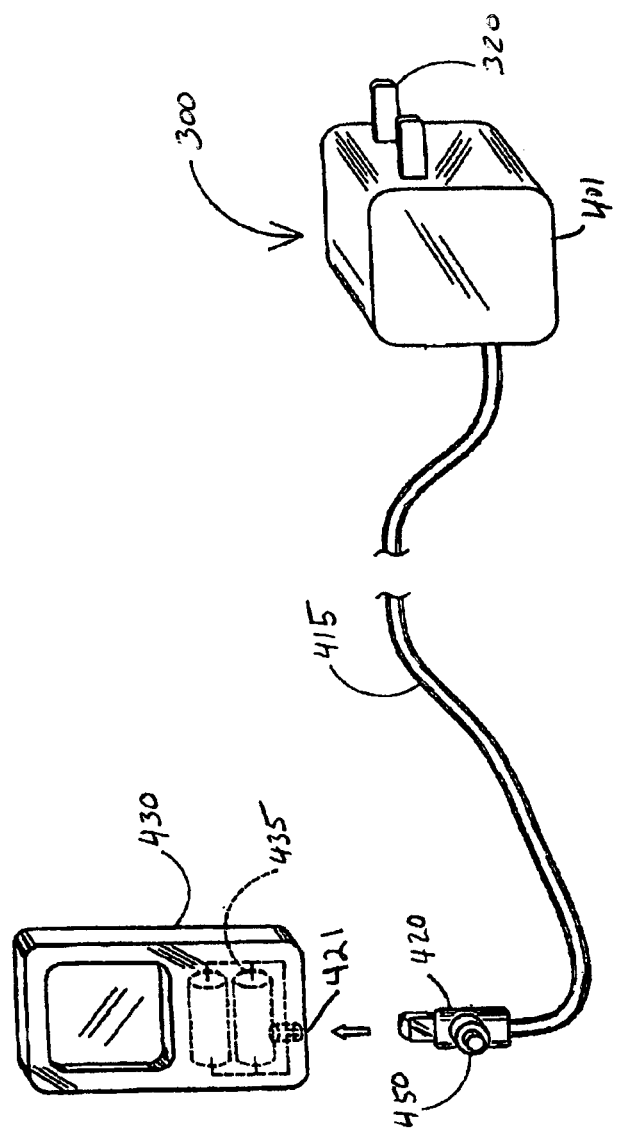

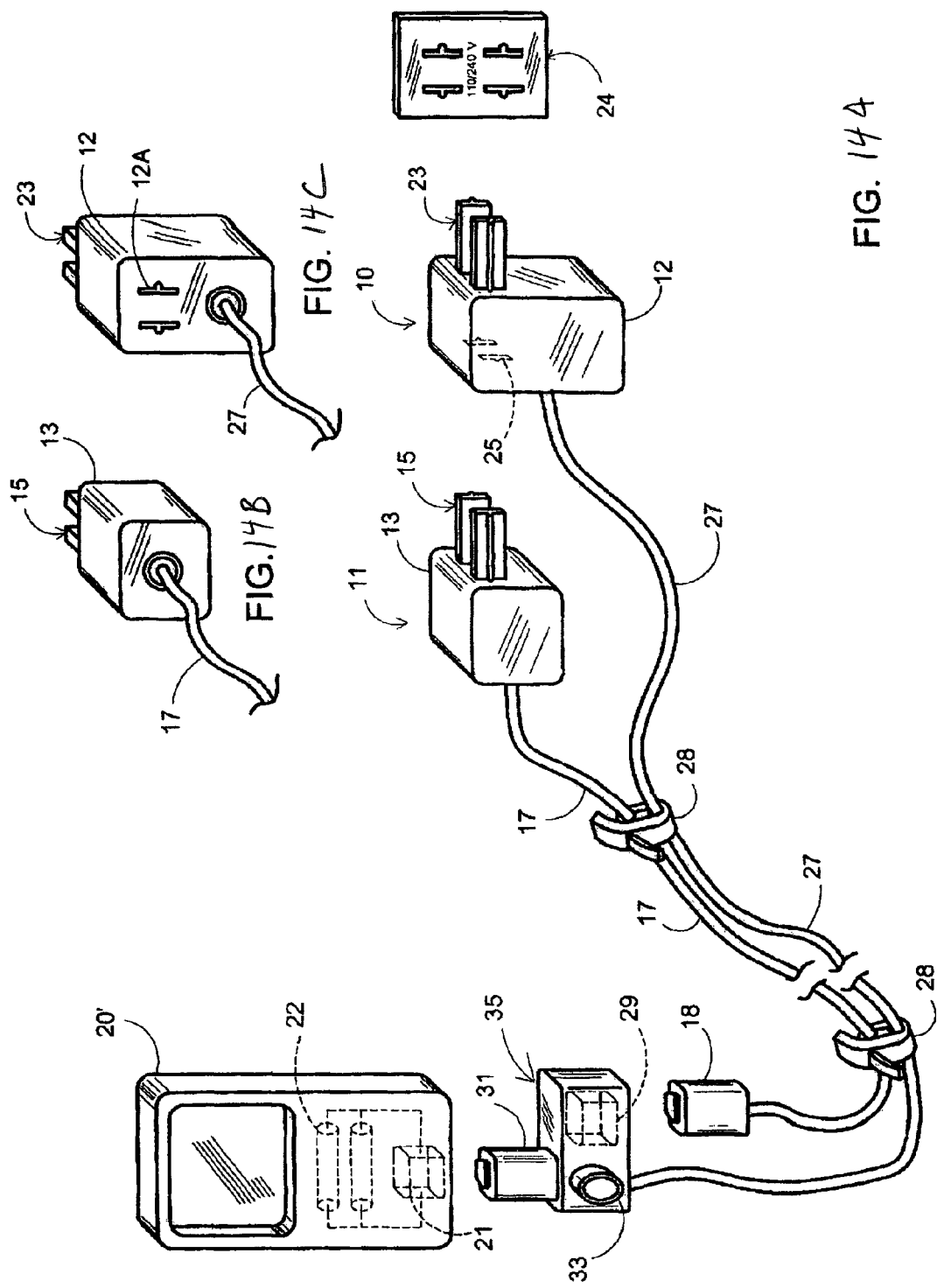

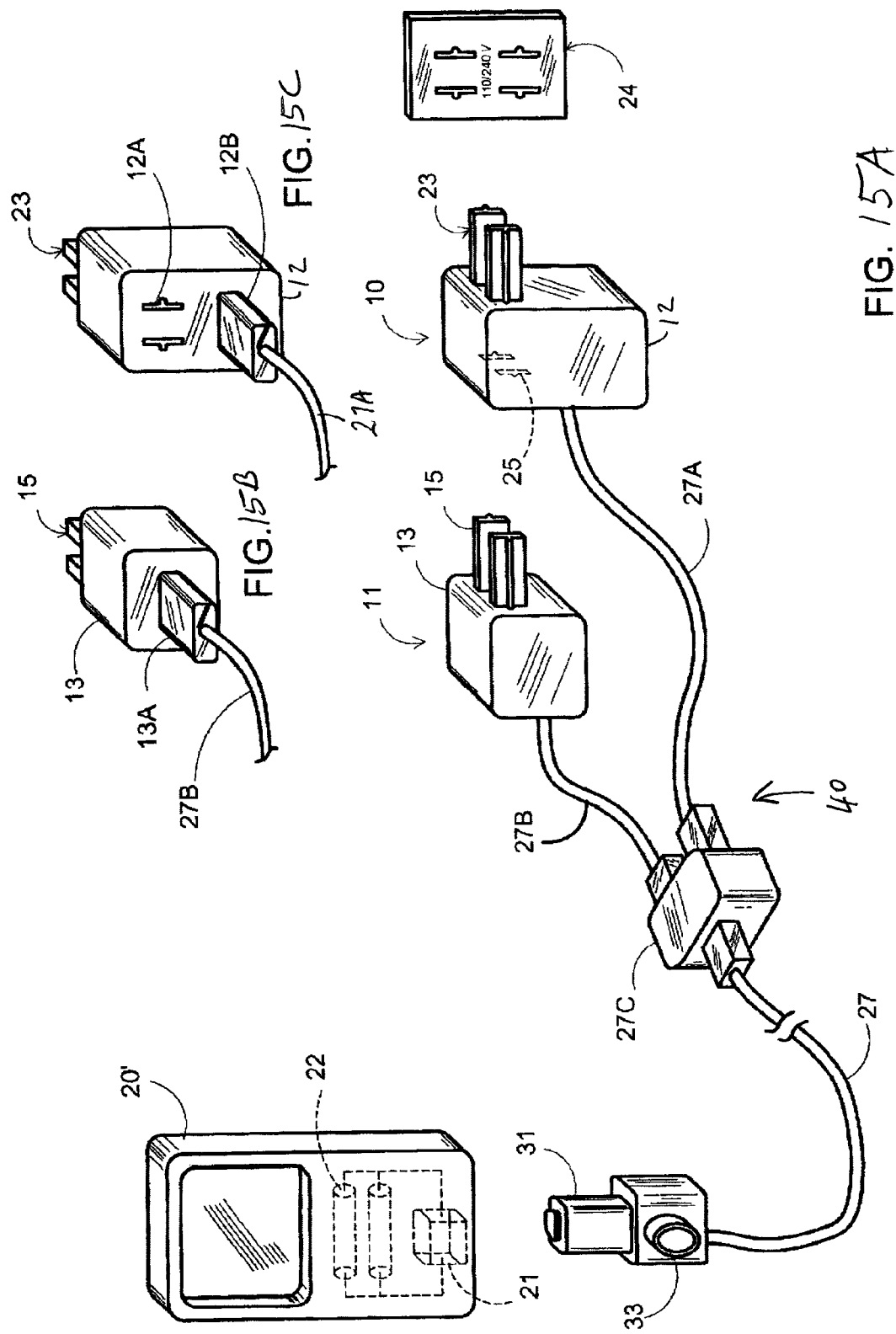

CURRENT SENSING CIRCUIT DISCONNECT DEVICE AND METHOD

CROSS-REFERENCE TO RELATED APPLICATIONS

This application is a Continuation-in Part-application of co-pending U.S. patent application Ser. No. 13/892,509 filed May 13, 2013, entitled Current Sensing Circuit Disconnect Device and Method, which is a Continuation-in-Part of co-pending U.S. patent application Ser. No. 12/843,151 filed Jul. 26, 2010, entitled Current Sensing Circuit Disconnect Device and Method, which claims priority from U.S. Provisional Application No. 61/228,213 filed on Jul. 24, 2009. This application further claims priority to U.S. Provisional Application No. 61/825,164 filed on May 20, 2013 entitled Current Sensing Circuit Disconnect Adaptor, the disclosures of each of these applications being incorporated herein, by reference, in their entireties.

FIELD OF THE INVENTION

The invention relates to battery charging devices and external power supplies, hereinafter also jointly referred to as "charging devices", and methods for disconnecting these charging devices from the mains or the electrical power source in order to eliminate or minimize the flow of current into the charging device when these charging devices and power supplies are still plugged in or connected to the mains, but are no longer charging or providing power to a load. In accordance with the present invention, the charging device is effectively disconnected from the mains when there is a reduction or cessation of current flow sensed in the secondary circuit or the load circuit.

DESCRIPTION OF THE RELATED ART

Recently, significant concerns have been raised regarding the environmental impact of wasted electricity. In particular the use of energy by devices standing in idle mode or standby mode has been criticized as using electricity to no purpose, and thus wasting electricity and the valuable resources used to generate it.

One particular example of wasted energy occurs with battery chargers and external power supplies (hereinafter charging devices) of all kinds, including those associated with such devices as laptop computers, tablet computers, power tools, electric toothbrushes and portable, mobile and/or cellular telephones, as well as other devices that include a battery to be charged. These charging devices exhibit two distinct low power modes that utilize energy even when there is no load connected to the charging device or battery to be charged. These modes are generally referred to as "standby" and "idle". "Standby" mode occurs when a charging device is plugged into an outlet or the mains, but there are no batteries or load connected to the charger (i.e., no load connected to the charging device). For example, this occurs when a cell phone charging device is plugged into the wall or the mains, but the cell phone is not connected to the charger.

"Idle" mode occurs when no charging is taking place because the battery attached or connected to the charging device is fully charged. In this situation, the charging device is connected between the mains and the load or device to be charged, and the load or device, typically a smart device, is charged and, therefore, is no longer charging. As a result the load draws no current from the charging circuit on the secondary side of the charging device, but the charging device is still connected to the mains and there is typically current flow in the primary circuit of the charging device which unnecessarily waists power. It is believed that billions of kW hours are currently wasted by battery charging devices running in the standby and idle modes. At present, people, users of charging devices, are being encouraged to physically unplug these charging devices from the mains when not in use, so as to reduce the amount of electricity wasted.

What is needed is a device that can be used to eliminate or cut-off the electricity usage of devices, and in particular, of charging devices, operating in the standby and idle modes or similar modes of operation.

What is also needed is a way to reconnect a disconnected charging device when the primary circuit has been disconnected, or is open.

What is also needed is an adapter that can be used to accomplish the present invention for a charging device without the benefits of the present invention.

What is needed is an adapter that can attach to an existing charging device, for the purpose to cut-off the current draw or electricity usage of such charging devices, and in particular, of charging devices, operating in the standby and idle modes or similar modes of operation.

Finally what is needed is a logic portion to communicate between the charging device and the load. One advantage would be for the load to prompt the charging device to turn back on when the load needs a charge to its batteries.

SUMMARY OF THE INVENTION

It is accordingly an object of the present invention to provide a device that can be added to, or incorporated in, battery charging devices to disconnect or mechanically break the primary circuit connected to the mains when the charging device is determined to be in a standby or idle mode of operation.

It is an object of the present invention to provide a charging adapter that can be added to or connected to a battery charging device to effectively disconnect the charging device from the mains when the charging device is determined to be in a standby or idle mode of operation or is no longer charging the charging device.

It is another object of the invention to reconnect the adapter and the charging device to the mains after it has been disconnected.

In one particular embodiment of the invention, the charging circuit includes a circuit interrupter in the primary circuit and a switch to reconnect the primary circuit to the mains after it is has been interrupted. Such a switch can be located either in the portion of the charging device plugged into the mains, or in or near the portion of the charging device that is plugged into (i.e., mated with) the load or the device to be charged or anywhere between.

In one particular embodiment of the invention, the switch to reconnect the primary circuit is a manual switch that reconnects the charging device to the mains after the charging device circuit has been interrupted, thus effectively disconnecting the charging device from the mains. This manual switch can be any switch that opens the primary circuit between the charging device and the mains. Such switch can be a relay switch, an electronic switch, or an opto coupler switch that may use infrared coupling or any other coupling to open and close a switch in the primary circuit. As used herein, opto coupler includes an opto-isolator, also called an optocoupler, photocoupler, or optical isolator, which is a switch or component that transfers electrical signals between two isolated circuits by using light.

In another embodiment of the invention, the switch does not require electrical power to close the circuit and reconnect the charging device.

In another particular embodiment of the invention, a switch is provided to reconnect the charging device to the mains after the charging device has been disconnected, which switch is closed using a fluidic tube in communication with the switch that interrupts or reconnects the primary circuit.

In a further particular embodiment of the invention, a switch is provided to reconnect the primary circuit of the charging device to the mains after the circuit has been interrupted, which switch uses a power source to reconnect the charging device where that power source is either a battery at the charging device or any residual battery power remaining in the load.

In one particular embodiment of the invention, a charging device has an electrical plug for connecting to the mains at one end and a jack at the other end for connection to a load to be charged and is configured to reduce the voltage from the mains (110 volts or 220 volts AC) to 5 volts DC. Typically, the charging device will charge the load until it is fully charged. However, after charging of the load or if the load is disconnected from the charging device, the primary side of the charging device remains plugged into the mains and thus continues to draw current. This current, though negligible, when multiplied, for example, by all users within a large city, becomes a significant becomes a significant amount of electricity that is wasted.

The present invention is an adapter that has an adapter plug and an adapter data cable for attachment to a charging device. The adapter, includes a circuit interrupter and a switch to reconnect the circuit after it is has been interrupted. Further the adapter plug includes a plug portion to engage a source of power such as a wall socket connected to the mains, and a receptacle portion to receive a plug portion from a charging device. The charging adapter further includes a data cable for communication and transfer of data and power from the charging device to the load.

Further a switch can be located either in the portion of the adapter plug or in the adapter data cable preferably at the distal end of the adapter data cable closest to the load to be charged.

In one particular embodiment of the invention, the switch is a manual switch which is a part of the charging adapter that reconnects the opened adapter circuit to reconnect the charging device to the mains after the charging adapter circuit has been interrupted. This effectively disconnects and reconnects the charging device from the mains.

Other features which are considered as characteristic for the invention are set forth in the appended claims.

Although the invention is illustrated and described herein as embodied in a current sensing circuit disconnect device and method, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

The present invention is illustrated by way of example, and not by way of limitation, in the figures of the accompanying drawings, in which like reference numerals refer to similar elements and in which:

FIG. 2 is a partial circuit diagram illustrating one particular embodiment of the instant invention wherein current is flowing in the primary side and secondary side of a transformer with the switches in a closed position as long as current flow is above a threshold in the secondary side of the transformer;

FIG. 3 shows the partial circuit diagram of FIG. 2, having the switches in an open position in accordance with one particular embodiment of the instant invention and no current flowing on the primary side or secondary side of the transformer because the coil does not sense current above a threshold in the secondary side of the transformer;

FIG. 7 is an isometric view of an alternate embodiment of the charging device of the instant invention wherein the manual switch to activate the closing of the electro-mechanical switch in the primary circuit is located at or near the connector jack that mates with the load.

FIG. 14A is an isometric view of a charging adapter of the present invention shown in relationship to the power charging device in accordance with one particular embodiment of the instant invention having a cell phone with rechargeable batteries.

FIG. 14B is a rear view of the charging device of FIG. 14A.

FIG. 14C is a rear view of the adapter body of FIG. 14A.

FIGS. 15A, 15B and 15C are variations of the circuit diagram in FIGS. 14A, 14B and 14C showing an alternate embodiment of the present invention, specifically an adapter for use with a power charging device.

DESCRIPTION OF THE PREFERRED EMBODIMENTS

Figure 1:
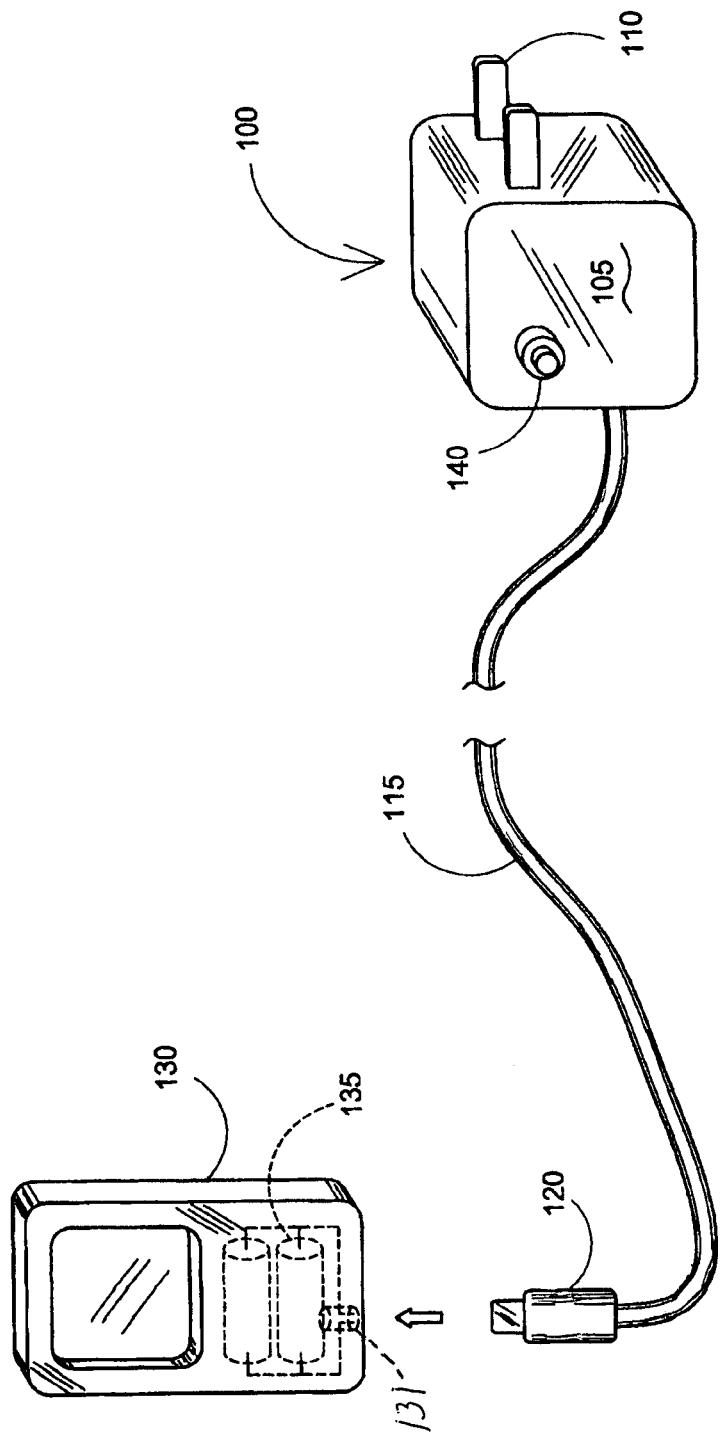
FIG. 1 is an isometric view of a charging device in accordance with one particular embodiment of the instant invention and a load, such as a portable cell phone.

Referring now to FIGS. 1 to 3, there is shown an illustration of a charging device 100 made in accordance with one particular embodiment of the instant invention. In the particular example shown in FIG. 1, the charging device 100 is a cell phone charger incorporating the traditional mobile phone charger elements. This is not meant to be limiting, as it will be seen how the present invention can be adapted for other kinds of charging devices (i.e., for rechargeable batteries, laptop computers, tablet devices, power tools, rechargeable toothbrushes, etc.) that may operate in standby and idle modes.

Figure 11:
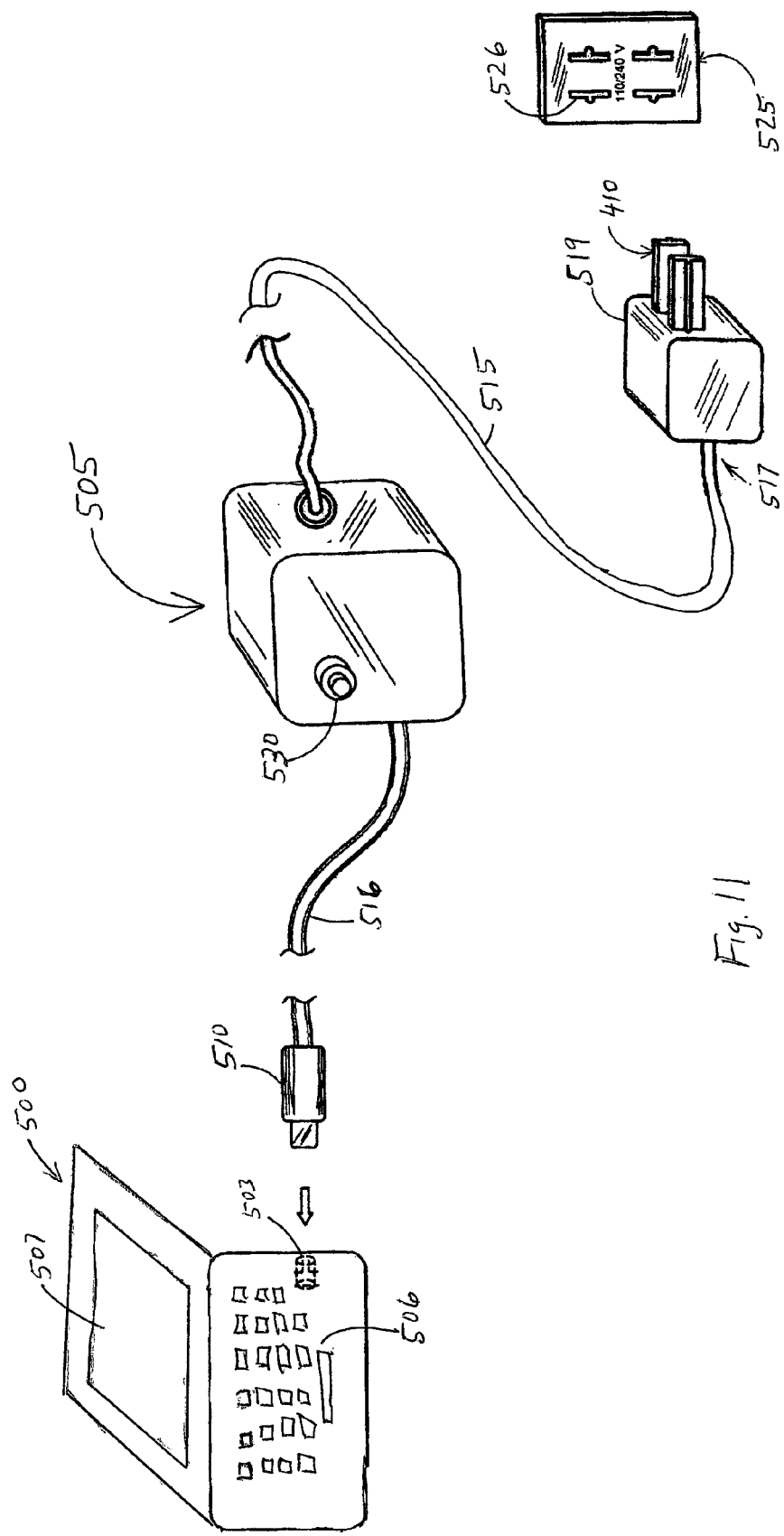
FIG. 11 shows a further embodiment of the invention wherein a charging device is provided for charging a laptop computer or other load having extended electrical cables from a power source.

Referring back to FIGS. 1 to 3, the charger 100 includes a plug 110 that permits the charging device 100 to be plugged into, and coupled with, and charged through, a wall outlet (not shown in FIG. 1, but shown for example in FIG. 11 wall socket 525). Thus, the charging device 100 is connected to mains, which in the United States is 110/120V AC. In the present particular embodiment, a charging device 100, as shown, takes the 120 AC from the mains and down converts it, using a transformer 200 such as a magnetic core with a primary coil 202 for connection to the 110/120 volt alternating current in the wall outlet or mains and a secondary coil 204. The charging device 100 further includes a jack or connector 120, such as a micro USB connector that connects to a load or cell phone 130, that provides a DC charging voltage to a load device, which, in the present example, is phone 130, when the connector 120 is connected in mating receptacle 131 at the base of phone 130. As such, the charging circuit of the charging device 100 also includes an AC/DC converter (not shown) connected to the secondary of the transformer 200, to convert the down-converted AC to DC, so as to provide a DC charging current from the connector 120 to the load device—phone 130.

Note that the connector 120 may be any form of connector or jack, as desired to connect the phone 130 to the charger 100. However, in the presently described embodiment, the connector 120 is illustrated as a micro-USB connector, in accordance with the recently introduced universal cell phone charger agreement. The connector 120 is shown as being at a distance from the body 105 of the charging device 100, but note that such distance can be as small or as large as desired. In particular, in one embodiment, the cord 115 is only a few inches, and it is envisioned that the plug 110 will be connected to a wall outlet via an extension cord. Alternately, the cord 115 can be several feet in length, so that the plug 110 can be directly plugged into an outlet, while the connector 120 is spaced from the outlet.

In accordance with one particular embodiment of the instant invention, the body 105 of the charging device 100 additionally includes a manually actuable, mechanical reset button 140, that may include an indicator light that the charger is active, that is used to manually reset a switch 145 triggered by the circuit of the instant invention. Referring more particularly to FIGS. 2 and 3, the instant invention operates on the principle of mechanically breaking or opening (i.e., interrupting) the electrical circuit between the wall outlet and the primary coil 202 of the transformer 200 when it is determined that no, very low current or a threshold current is being drawn by the secondary coil 204 of the transformer 200. Once the electrical circuit is interrupted at this location—the primary coil 202 circuit, the primary coil 202 circuit will not be able to draw any more current from the mains until the mechanical button 140 is manually reset, thus closing the switch 145. In other words, while the primary circuit 202 is interrupted, no current will be drawn by the charging device 100 from the mains until the primary circuit connection is restored by manual actuation of the button 140 which could also be a momentary switch.

Alternatively, the disconnection and then reconnection of the load can trigger the reconnection or closing of the primary circuit.

In the present particular embodiment, a current sensing device such as a current sensing coil 210 or resistance, is placed in close proximity to, or in the path from, the output wires of the secondary coil 204 of the transformer 200 to the load or cell phone 130. Alternately, the current sensing device 210 can be placed after the AC/DC converter, if desired. When a mobile phone or cell phone 130 is initially connected to the connector 120, the charging device 100 is in or will be in the active mode, and current is drawn from the secondary side 204 of the transformer until the battery 135 of the mobile phone 130 connected to the charging device 100 is fully charged. The current sensing device 210 measures the current being drawn through the secondary side 204 over the cord 115 and, for so long as current is being drawn by the load via the connector 120, the current sensing device 210 provides an output that maintains the switch 145 closed. However, once the battery 135 is fully charged, or the phone 130 is disconnected from the connector 120, current ceases to be drawn from the secondary coil 204 of the transformer 200 over the cord 115. Once the current sensing device 210 senses that the current draw has dropped off significantly or even that no current is being drawn by the load device at the connector 120, the current sensing device 210 signals the switch 145 to open. Thus opening the connection between the primary coil 202 of the transformer 200 and the plug 110, and interrupting the primary-side circuit. When the switch 145 is open, the charger 100 has an open circuit and no power is used thereby and no current is drawn from the power source such as the mains. To restart or close the circuit, the user must reconnect the load device—i.e., phone 130—in need of a charge by connecting the load device to the jack 120 if not already connected, and manually actuating the reset button 140, thus closing the switch 145 and reconnecting the primary coil 202 to the household AC mains. The switch 145 breaks or opens the circuit connection between the household mains and the primary coil 202 of the transformer 200 without necessitating the charger 100 being unplugged from the wall or the mains.

Additionally, the switch 145 is illustrated as double-pole double-throw mechanical switch in FIGS. 2 and 3, but any type of switch or relay that can be operated to open the circuit between the primary coil 202 of the transformer 200 and the plug 110 can be used. For example, a relay can be provided in place of switch 145, which relay is energized by the output of the current sensing device 210, and which normally opens when current is not provided from the current sensing device 210 (i.e., when there is no current drawn from the secondary coil 204). Further, additional circuitry can be provided to open the switch 145 once the current sensed by the current sensing device 210 drops below a predetermined level. Other switches such as electromechanical switches or opto-coupler switches can be used, all open the circuit between the power source e.g. the mains and the charging device so that the charging device ceases to draw power or current from the power source.

Figure 4:
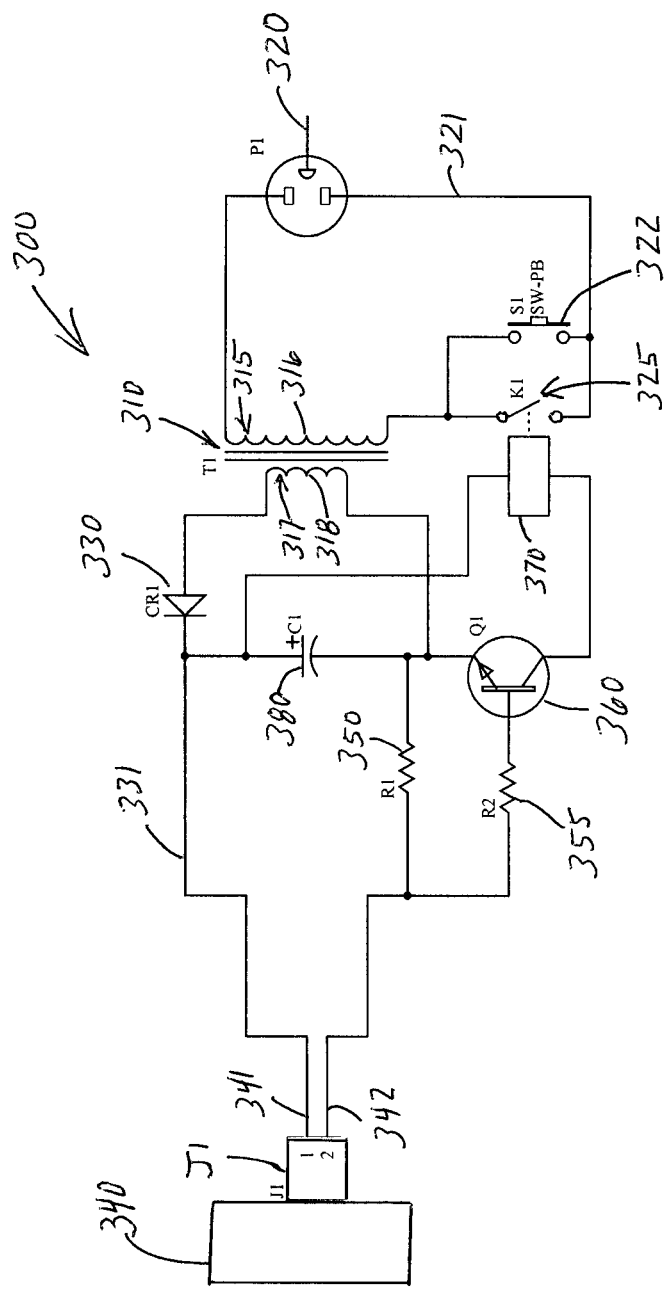
FIG. 4 is a circuit diagram showing one embodiment of the present invention wherein the mechanical switch is an electro-mechanical switch that interrupts the primary side circuit of the charging device in order to open and disconnect the primary side circuit from the mains and a momentary switch in the primary side circuit to reconnect the charging device once disconnected.

Referring now to FIG. 4, there is shown another embodiment of the present invention, wherein the mechanical switch (145 of FIGS. 2 to 3) is represented by the electromechanical switch/relay K1. More particularly, FIG. 4 is a partial circuit diagram for a charging device 300, which is substantially similar to the operation of the heretofore described circuit and charging device 100 of FIGS. 1 to 3. Transformer 310 has a primary side 315 and a secondary side 317. Plug 320 connects the primary side 315 of transformer 310 to the mains (110 volt wall outlet or other wall outlet voltages, such as 220 volts, see a wall outlet as shown in FIG. 11). On the primary side 315, the primary side circuit 321 includes a primary coil 316, a manually actuable button 322 which may be a momentary switch, a relay or other electro-mechanical switch K1 including a relay contact 325, and plug 320.

The secondary side 317 of transformer 310, includes a secondary coil 318, a diode rectifier 330, a connector or jack J1 for connection to a load 340, having a first pin 341 and a second pin 342, a first resistor 350, a second resistor 355, a transistor 360, a coil 370, part of the relay K1, a secondary side circuit 331 and a filter capacitor 380. Transistor 360 is configured to operate as a solid-state switch that controls the state of the relay K1. For example, when current is being drawn by a load 340, the transistor 360 is saturated and current flows through the coil 370, closing the relay contact 325 in the primary side circuit 321. Please note that the use of a transistor for the switch 360 is not meant to be limiting, as the relay K1 can be controlled by another type of solid state switch or other similar electrical devices, such as, but not limited to, an FET switch, a zener diode or other switching logic device or opto coupler devices.

Transformer 310 can be a high frequency transformer or a 60 cycle line voltage step down transformer from 110 volts to 5 to 6 volts alternating current. From the secondary side 317 of transformer 310 the current is rectified by diode rectifier 330. The current then flows through load/device 340 such as a cell phone and the bulk of the current flows through shunt resister 350. Capacitor 380 filters the rectified DC current to the load 340.

When the voltage is the same across resistor 350 and resistor 355 then at the Q1 junction of transistor 360 the emitter is on and current flows and magnetic coil 370 is energized, holding contact or switch 325 in a closed position. Coil 370 includes an internal spring that causes the switch 325 to open when current ceases to flow through coil 370. When switch 325 opens, the primary circuit 321 is interrupted and current no longer flows through the primary side circuit 321. Current flows in the primary circuit 321 when plug 320 is connected to the mains and when switch or contact 325 is closed due to the relay coil 370 being energized. To start current flow in charging device 300, plug 320 will be plugged into a power source (i.e., typically a household outlet such as a wall socket 525 shown in FIG. 11). With a load 340 attached to charging device 300 the manual switch 322 (i.e., a momentary switch, in the present example, corresponding to push button 140 of FIG. 1) is engaged with some force or actuation from a user which starts or allows current to flow through the primary side circuit 321. This primary side current flow will cause current to also flow through the secondary coil 318. With a load 340 attached to a connector or jack J1, current will flow to the load 340 and through the secondary-side circuit 331, saturating the solid state switch (i.e., transistor 360) and energizing the relay K1. Current flowing through coil 370 closes the contact or switch 325 and restores current flow through the primary-side circuit 321, even after momentary switch 322 has reopened.

Once current flow in the primary side circuit 321 and secondary-side circuits 331, has been restored, the transistor 360 will remain in saturation as long as the load 340 continues to be connected to the secondary circuit 331 and the plug 320 is connected to the mains, thus charging the load 340. Once the load device 340 stops drawing enough current to turn-on the transistor 360 (or drops out of the circuit entirely), the transistor 360 turns off, current stops flowing through the coil 370, the contact 325 opens and current flow through the primary-side circuit 321 is interrupted until a load 340 is again attached and switch 322 is manually pressed.

More particularly, when load 340 is disconnected or there is a drop in current flow in the secondary circuit 331 that meets a threshold current level (i.e., below the turn-on threshold of the transistor 360) transistor 360 turns off, causing the magnetic coil 370 to lose power, and switch/contact 325 opens. When switch 325 opens there is no longer current flow in primary-side circuit 321 and power is no longer taken or drawn from the mains. Though charging device 300 is still connected to the power source or plugged into the wall or other power source, there is no current flow in the primary circuit 321 because switch 325 is open and the circuit 321 has been effectively disconnected from the mains.

As discussed above, to reconnect the charging device 300 to the mains, switch 325 in primary-side circuit 321 must be re-closed by restoring current flow in the primary-side circuit 321, via a manual actuation, required from a user, of button 322.

Figure 4A:
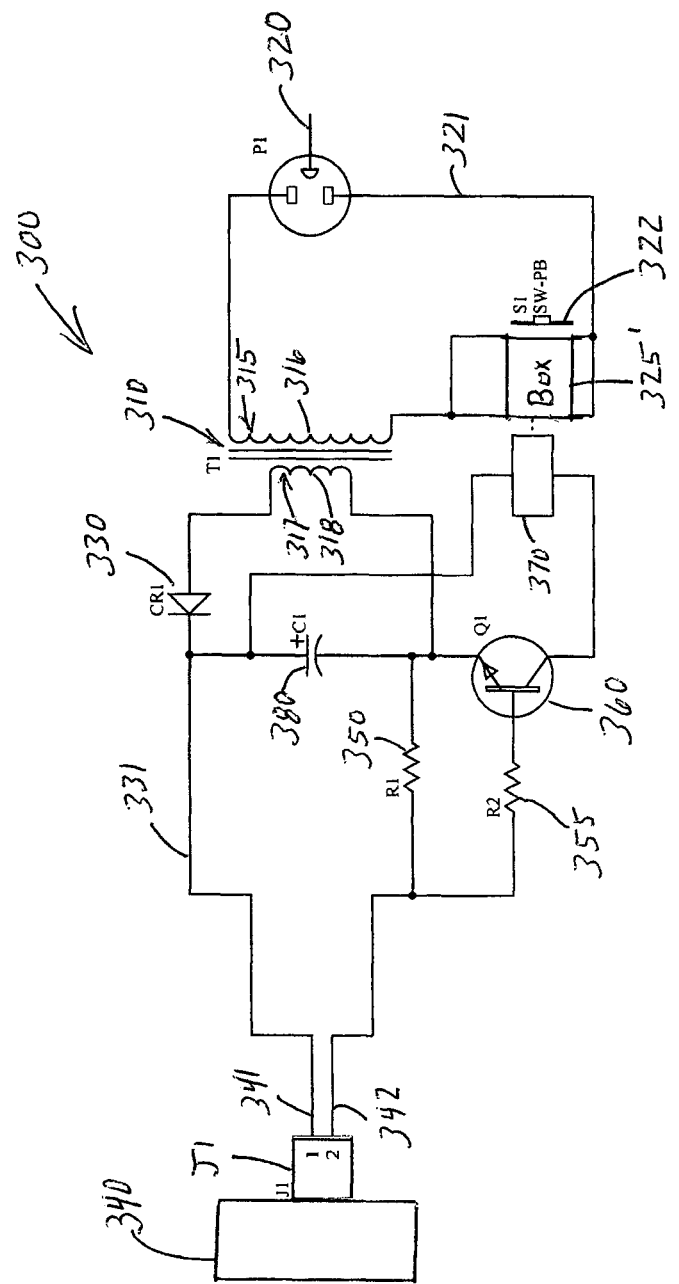
FIG. 4A is a circuit diagram substantially similar to that of FIG. 4, wherein the switch 325 of FIG. 4 is represented generically by box 325', which includes an electrical arrangement that can perform the same function as the switch 325 and/or switch 320 of FIG. 4.

The circuit of FIG. 4A is substantially similar to that of FIG. 4, except that switch 325' can be any type of switch actuated by coil 370 of the secondary-side circuit 331. Thus, switch 325' is shown generically in "black box" form, since the switch 325' can be any number of circuits or solid state devices, including the double-pole double-throw switch 145 described in connection with FIGS. 2 and 3.

Figure 5:
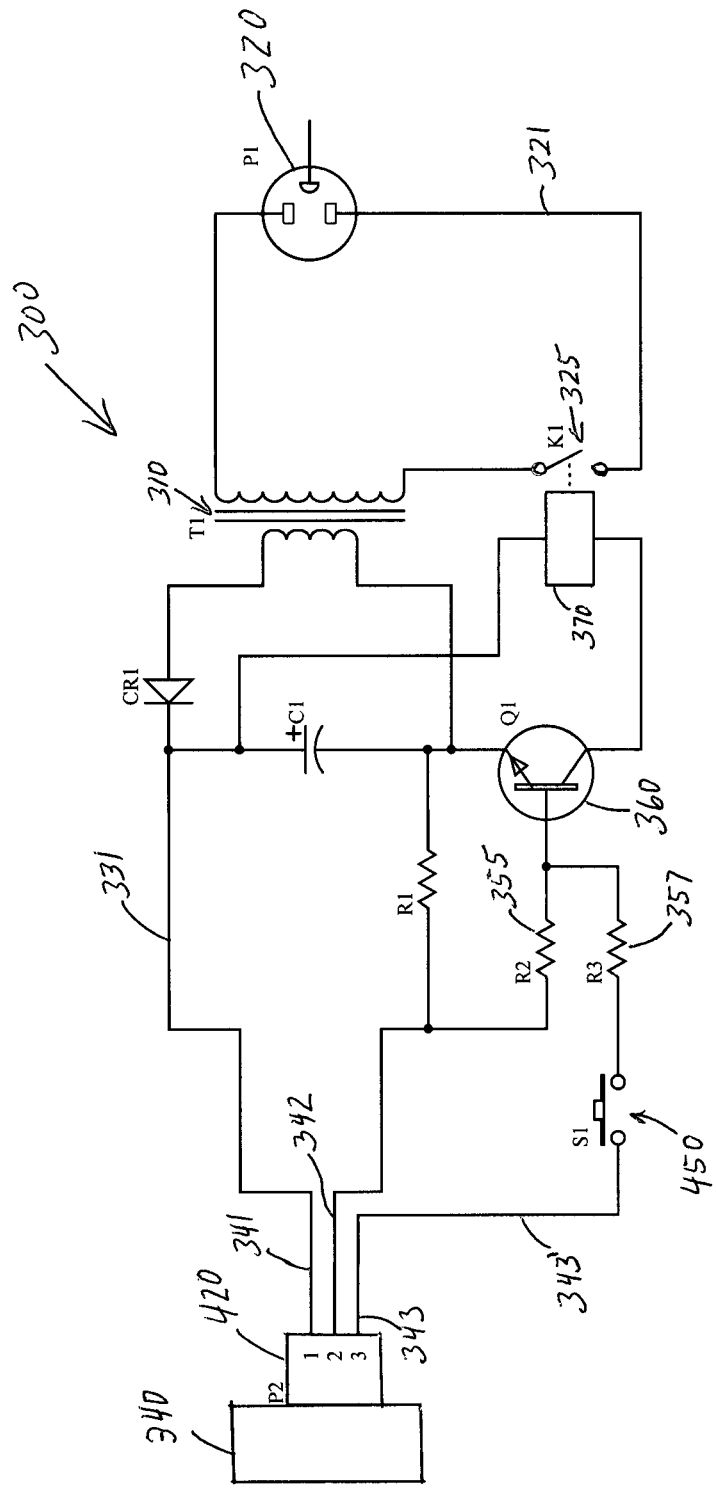
FIG. 5 is a circuit diagram showing one particular embodiment utilizing an electro-mechanical switch to interrupt the primary side circuit of the charging device in order to open and disconnect the primary side circuit from the mains and a momentary switch in the secondary side circuit to that initiates closing of the electro-mechanical switch to restore current flow to the primary side circuit from the mains.

Referring now to FIGS. 5 and 7, there is shown a circuit in accordance with another embodiment of the invention, though substantially similar to FIG. 4 as to the operation of the transistor 360 and switch K1. In the circuit of FIG. 5, the manually actuated button or momentary switch 450 is located on the connector or jack 420 in close proximity to the load 340—in the current example, a cell phone 430, as shown more particularly in FIG. 7. Jack 420 plugs into receptacle 421 at the base of phone 430. In this embodiment, the charging device 300 shown in FIG. 5 and FIG. 7 has an activation switch 450 that is located at the point of use where the jack 420, the distal end of the charger cord 415 is engaged or plugged into load 340 for example a cell phone 430 having a rechargeable battery 435. In this embodiment, the plug 320 can remain plugged into the mains. When the load 340 is disconnected from the connector 420 of the secondary-side circuit 331, the transistor 360 turns off and the relay K1 is de-energized (i.e., current stops flowing through coil 370 and contact 325 opens). Thus, the primary-side circuit 321 is interrupted (i.e., opens) when switch 325 opens, as previously described in connection with FIG. 4, and the charging device 300 is effectively disconnected from the mains though plug 320 remains plugged into the mains or wall socket.

Similarly, in the event load 340 or the batteries 435 of cell phone 430 are charged and cell phone 430 no longer draws current in the secondary circuit 331, then as described above, transistor 360 would turn off and the contact 325 would open. Charging device 300 is effectively disconnected from the mains though plug 320 remains plugged into the mains or wall socket and the load or cell phone 430 is still connected to the charging device 300.

When it is desired to charge the rechargeable batteries 435 of cell phone 430 or of load 430, the connector 420 is plugged into a mating connector 421 of the load 430, and activation switch 450 is depressed when the load 340 or phone 430 is connected to the jack 420 and to the secondary circuit 331. In the event phone 430 had not been disconnected, activation switch 459 would still be depressed. Then the primary circuit 321 will be energized with current flow and the charging device 300 will begin charging the load.

In the embodiment illustrated in FIGS. 5 and 7, where the activation switch 450 is located at the distal end of charger cord 425, a circuit includes switch 450 and a third resistor 357. This circuit obtains power from the device 430 (FIG. 7) or load 340, via a pin 343 on the connector or jack 420. For example, residual power in the batteries 435 of a load 340 such as a cell phone 430 is provided to the base of the transistor 360 via a pin 343 of the connector 420 and a wire connection 343' closed by actuation of momentary switch 450. Though the cell phone 430 may have lost its full charge and may not be usable as a cell phone because the battery 435 has become substantially discharged and no longer a sufficient power threshold to operate the phone 430. However there is likely in most situations a sufficient threshold or residual voltage remaining in the battery 435 to provide sufficient current for an instant, to the base of the transistor 360 when switch 450 is activated or pressed, so as to activate coil 370 and close switch 325. This restores the current flow through the primary-side circuit 321 and activates the charging device 300 to charge the load 340 or cell phone 430.

Figure 6:
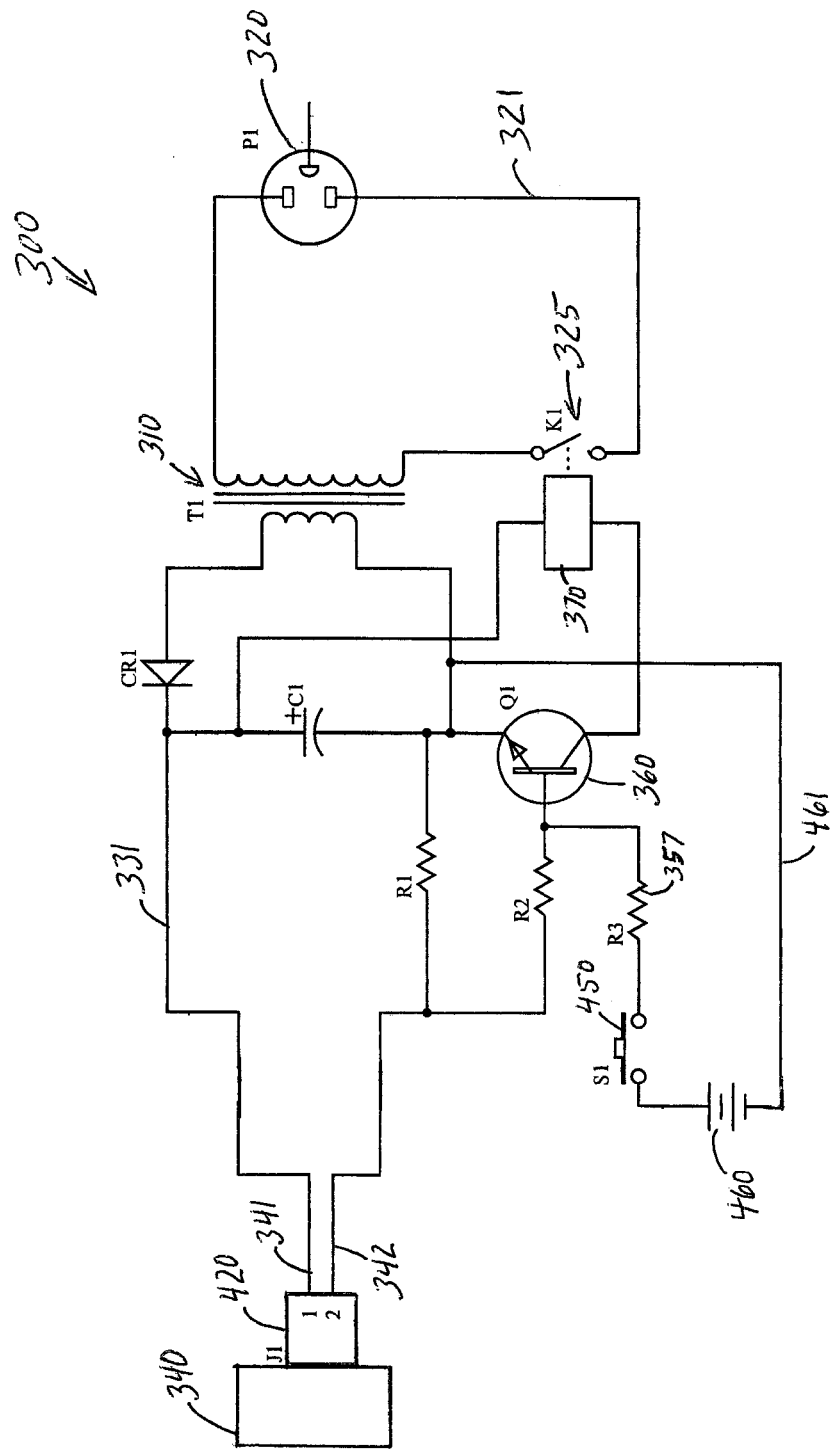
FIG. 6 is a circuit diagram showing a further particular embodiment of the invention wherein the mechanical switch is an electro-mechanical switch in the primary side circuit of the charging device to open and effectively disconnect the primary side circuit from the mains, and a momentary switch in the secondary side circuit to initiate closing of the electromechanical switch in the primary circuit to reconnect the charging device once interrupted and wherein the power for the momentary switch in the secondary side circuit is from a power source in the secondary circuit.

Referring now to FIGS. 6 and 7, there is shown a further additional embodiment of the present invention similar to that shown in FIG. 5. In the present embodiment, the activation switch 450 is at the distal end of cord 415, as shown in FIG. 7, but the power provided to the base of transistor 360 by the closing of the switch 450 is provided by a small battery 460, such as a hearing aid battery or other long life battery in the circuit 461 of FIG. 6. This battery 460 can be located in the area of the jack 420 or in the casing or housing 401 with the other electrical components of charger device 300. In this embodiment, when switch 450 is manually closed, the current in the battery 460 is provided to the base of the transistor switch 360, for a moment, momentarily energizing the coil 370 and initiating the closing of the switch 325. Once switch 325 is closed, current flow is restored through the primary-side circuit 321 and, consequently, through the secondary-side circuit 331, despite the momentary switch 450 opening and the battery 460 dropping out of the circuit. Thus, power to the charging device 300 can be interrupted and restored without ever removing or reinserting the plug 320 into the wall outlet or mains or removing and reconnecting the load 340. Thus when the load 340 becomes charged and ceases to draw current from the secondary circuit 331, the load can either be disconnected or not. In the event it is not disconnected, the primary circuit 321 is opened as previously described. In this instance with the load 340 still connected, no current is drawn by the charging device and when ready to recharge the load, button 450 is activated and the primary circuit will be reconnected.

Figure 6A:
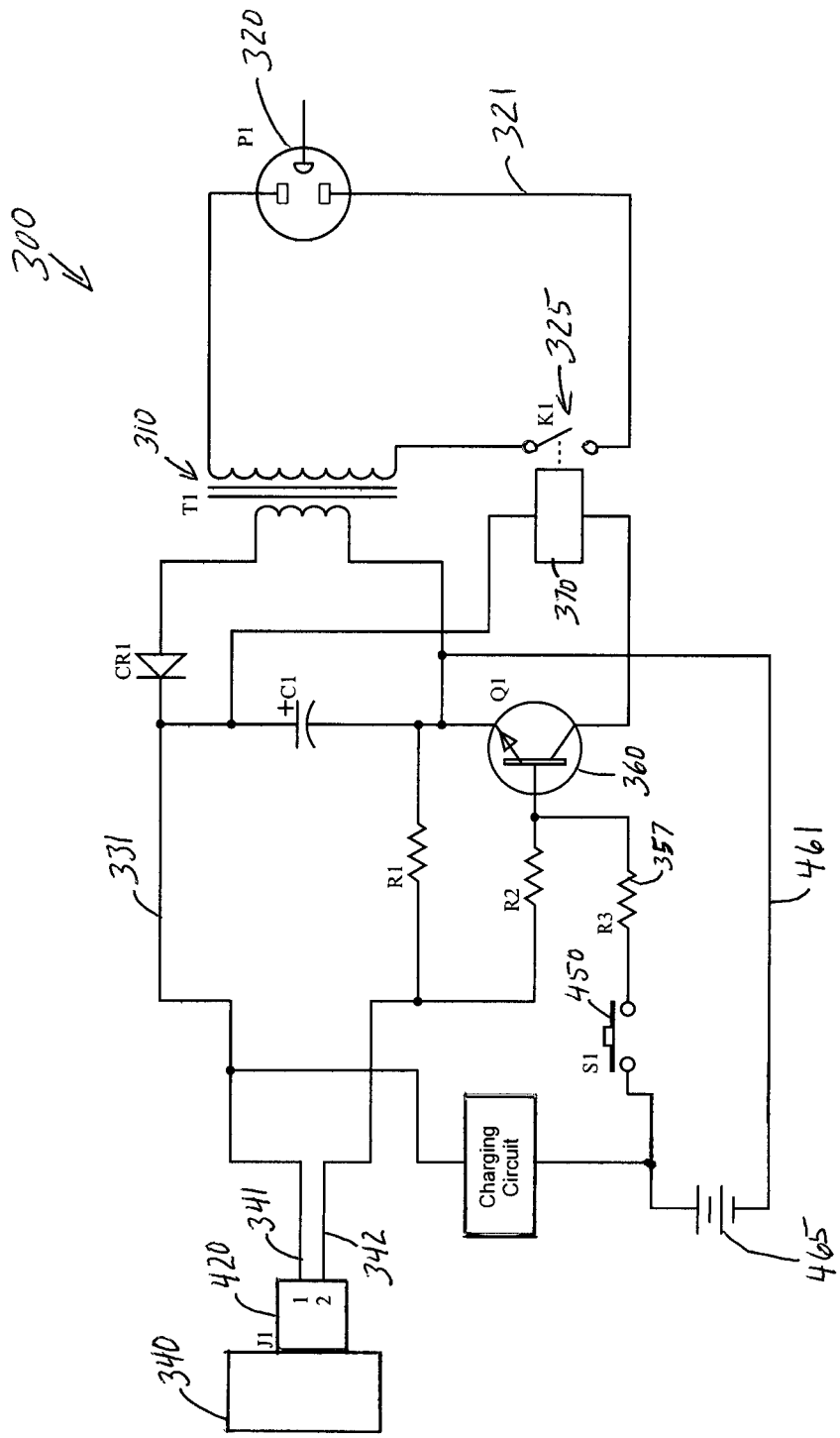
FIG. 6A is an alternative embodiment similar to FIG. 6, where the power source in the secondary circuit is a rechargeable battery.

Referring now to FIGS. 6A and 7, there is shown another alternate embodiment of the invention, similar to that of FIG. 6, wherein the activation switch 450 is at the distal end of cord 415, but wherein the power applied to the circuit by manually closing the momentary switch 450 is provided by a rechargeable battery 465. Additionally, the circuit 331 of FIG. 6A includes a charging circuit 462 for recharging the rechargeable battery 465 when current flows through the secondary circuit 331 to the load 340. In this way, rechargeable battery 461 will have sufficient power at all times to turn-on transistor 360 and energize the coil 370 when switch 450 is activated or closed.

Figure 8:
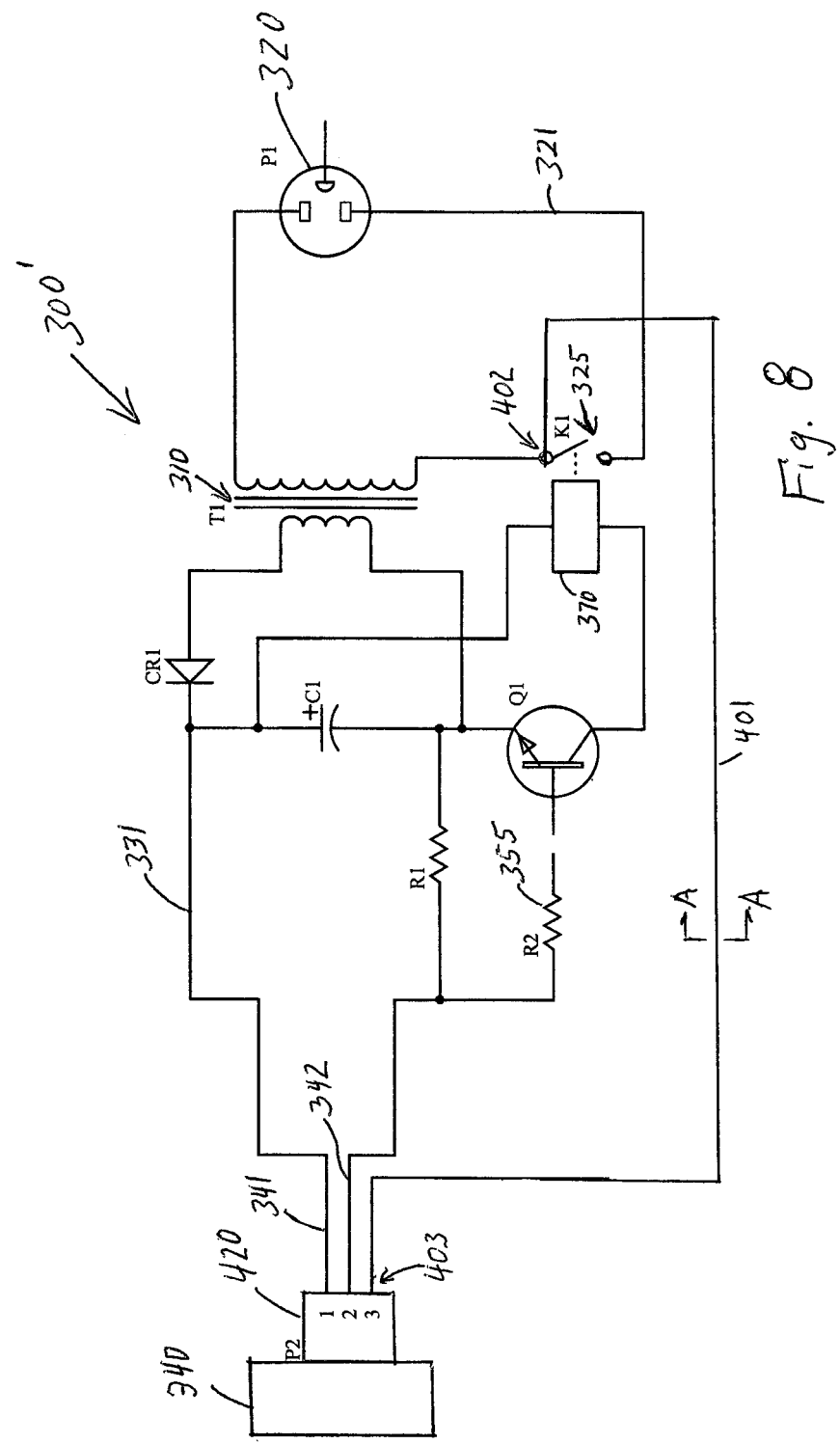
FIG. 8 is a diagram showing a circuit of one embodiment having an electro-mechanical switch in the primary side of the charging device to open and disconnect the primary side circuit from the mains and a fluid pusher at or near the location of the load or the connection jack to activate the closing of the electro-mechanical switch in the primary circuit to reconnect the charging device once disconnected where the fluid pusher connects to a fluidics tube to activate and communicate with the electro-mechanical switch located in the primary side of the charging device.
Figure 10:
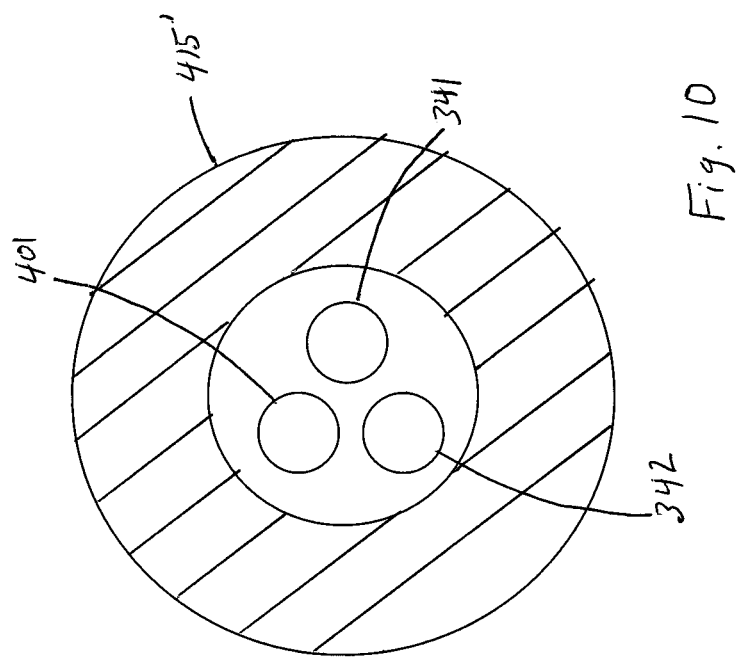
FIG. 10 is a cross section of a charging cord with the fluidics tube there-within.
Figure 9:
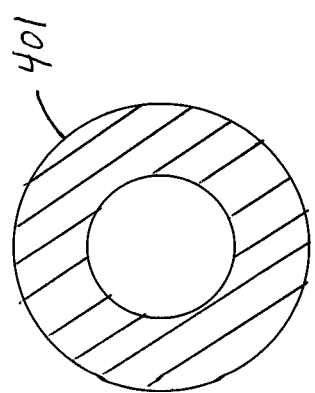
FIG. 9 is a cross section of fluidics tube useful with the circuit of FIG. 8.

Referring now to FIGS. 7-10, there is shown a further embodiment of the present invention, wherein the activation switch 450 at the distal end of cord 415 of FIG. 7 is provided as an activation switch or fluid pusher 403 at the connector to load 340 as seen if FIG. 8 and charging device 300'. In the present particular embodiment, the switch or contact 325 is physically pushed and forced closed by a mechanical pusher 402, actuated by a fluid within a fluidic tube 401, initiated by pushing the fluid pusher 403. The fluid, may be air or a liquid such as oil or other liquids, can be contained in a fluidic tube 401 in fluid communication with the fluid pusher 403, which could be a bulb or similar device located at a first end of tube 401. Actuation of the fluid pusher forces the fluid to apply pressure to the mechanical pusher 402 at a second end of tube 401. Tube 401 can be housed within charging cord 415' as shown in FIG. 10. The cross section of tube 401 taken from lines A-A in FIG. 8 is shown in FIG. 9 and a cross section of a charging cord 415' with electrical connectors 341 and 342 for the load 340 and the fluidic tube 401 is shown in FIG. 10. Bulb 403 and pusher 402 are in fluidic communication through tube 401 such that any movement of fluid caused by squeezing or pressing bulb 403 causes a similar movement at pusher 402 that for example could push switch 325 to a closed position or an arm connected to switch 325 that would close switch 325 and close the circuit 321 to start current flow in primary circuit 321.

Referring now to FIG. 11, there is shown a further embodiment of the invention wherein a charging device 505 is provided for charging a load such as a laptop computer 500. The charging device 505 operates substantially similarly to the charging devices described herein in connection with FIGS. 4, 6 and 6A, wherein the manually actuable reset button 530 is disposed at the charging device 505, but wherein the charging device 505 is remote from the wall socket 525, and thus more accessible. More particularly, with the use of longer electrical wiring such as an extension cord 515, button or momentary switch 530 is remote from the power source such as receptacle 525 in wall socket 525. The load for example a laptop 500 includes a keyboard 501, a display screen 502 and a receptor or jack 503 for receiving a mating jack 510 from charging device 505. Charging device 505 includes, at a first side, electrical cable 515 at its distal end 517 connected to an electrical plug 519 and prongs 410 to plug into an electrical source of energy, like a wall outlet 525 having a first receptacle and a second receptacle 526 for receiving plug 519. Charging device 505 has at its other end, an electrical cable 516 with a jack 510 at its distal end. Jack 510 is configured to mate with receptacle 503 on the laptop computer 500.

Additionally, the charging device 505 includes a manually actuable button 530 that, when depressed, will restore current flow to the primary-side circuit, as described in connection with the embodiments of the invention discussed hereinabove. FIG. 11 is also representative for other loads such as portable drills, portable toothbrushes, electric vehicles including cars and bikes which have a charging device having a transformer connected to a power source such as a wall socket or the mains on one side and a load on the other.

Figure 12:
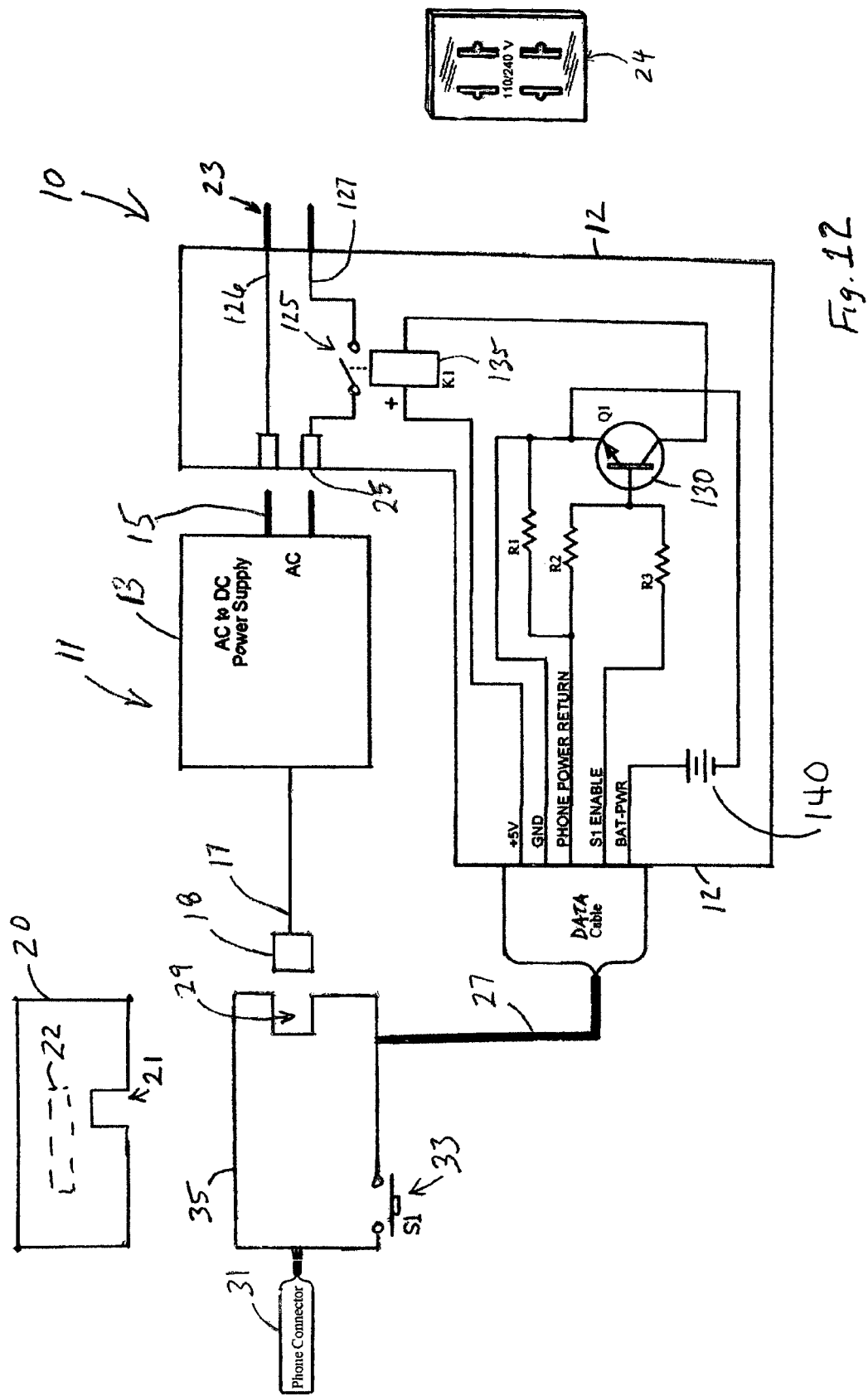
FIG. 12 is a circuit diagram showing an embodiment of the present invention, specifically an adapter for use with a power charging device.

Referring now to FIG. 12, there is shown an illustration of a charging adapter 10 made in accordance with one particular embodiment of the instant invention which include circuits similar to those described hereinbefore. In the particular example shown in FIG. 12, the charging adapter 10 is shown in relationship to a cell phone charger which incorporates the traditional elements of an external power supply or power charger 11, such as an AC to DC power supply 13, a plug 15 or portion thereof for plugging into a power source such as a wall receptacle 24 connected to the mains, a cable or data cable 17 and a jack 18 for connecting power supply 13 and cable 17 to a load 20 such as a cell phone 20' as shown in FIGS. 14A and 15A or other device to be charged. Load 20 having a receptacle 21 for receiving jack 18 where receptacle 21 and jack 18 are complementary and a battery, such as a rechargeable battery 22. This is not meant to be limiting, as it will be seen how the present invention can be adapted for other kinds of power chargers, external power supplies and charging devices (i.e., for rechargeable batteries, laptop computers, tablet devices, power tools, rechargeable toothbrushes, etc.) that may operate in standby and idle modes.

The charger adapter 10 includes portions of a plug or adapter plug 23 that permits the charger adapter 10 to be plugged into, and coupled with a wall outlet 24. Thus, the charging adapter 10 is connected to a power source such as the mains through outlet 24, which in the United States is 110/120V AC with different voltage ranges in other countries of the world. Charging adapter 10 further has an adapter receptacle 25 to receive the charger plug 15, an adapter data cable 27, a receptacle 29 to receive the charger jack 18 from charger cable 17, an adapter output jack 31, for connection to load 20 in receptacle 21 and a switch S1 identified as switch 33 which is a manually actuable or electronically actuable, reset switch or button which may be any type of switch such as mechanical, momentary, electronic or electronically controlled. Receptacle 29, jack 31 and switch 33 may or may not be in a housing 35 which is a part of or connected to adapter cable 27. Receptacle 29 may also be in housing 12. Housing 12 and housing 35 may be the same housing or separate housings.

In the present particular embodiment, a charging device 11 includes a transformer having a primary coil for connection to the 110/120 volt alternating current in the wall outlet 24 or mains and a secondary coil. This transformer can be a high frequency transformer as well. The primary coil is a part of a primary circuit that is connected to the mains or power source. The secondary coil, as known in the art, is a part of the secondary circuit and provides the down converted AC to DC so as to provide a DC charging current to the load through cable 17 and connector 18. The charging device jack or connector 18, such as a micro USB connector that connects to a load 20 or cell phone 20', that provides a DC charging voltage to a load device 20, which, in the present example, is a cell phone, when the connector jack 18 is connected in mating receptacle 21 at the base of phone 20. As such, the secondary circuit of the charging device 11 also includes an AC/DC converter connected to the secondary coil, to convert the down-converted AC to DC, so as to provide a DC charging current from the connector 18 to the load device 20—such as cell phone 20'. Thus power adapter 11 has a primary circuit which includes the primary coil and which connects to the power source or mains. The power adapter 11 has a secondary circuit which includes at least the secondary coil, the jack 18 and the data cable 17. When power adapter 11 is plugged in the wall, current from the mains runs through the primary circuit through the primary side of the coil. Current flows though the secondary coil through the secondary circuit through the jack 18 to charge the load 20 with batteries 22 or cell phone 20' and cell phone batteries 22.

Note that the connector 18 may be any form of connector or jack, as desired to connect the phone 20 to the charger 11. The connector 18 is shown as being at a distance from the body of the power supply 13 of the charging device 11, but note that such distance can be as small or as large as desired.

In accordance with one particular embodiment of the instant invention, charger adapter 10 is connected on both ends of power charger 11. At one end of power charger 11, plug 15 is connected or plugged into receptacle 25 of charging adapter 10. At the other end of charger 11, charger jack 18 at the distal end of cable 17, is connected or plugged into adapter receptacle 29. Cable 17 may be directly connect to secondary circuit at housing 13 or removeably attachably connected by a USB plug to housing 13. As can be seen in FIG. 1, charger 11 performs its functions described above, but now power is supplied through charging adapter 10 and the power and data are delivered through adapter jack 31.

Referring more particularly to FIG. 12 the instant invention operates on the principle of opening or mechanically opening or interrupting the electrical circuit between the wall outlet 24 and the primary circuit of the power charger 11, when it is determined that no, very low current or a threshold current is being drawn by the secondary circuit of power charger 11.

The primary circuit of power adapter 11 is effectively interrupted, with a switch 125 located in charging adapter 10. Plug 15 is attached to the mains at socket 24 by two circuits 125 and 126 through adapter 10. These circuits 126 and 127 become a part of or an extended primary circuit when charger 11 is plugged into adapter 10 and adapter 10 is plugged into the mains at for example socket 24. Once the extended primary circuit is interrupted, the power adapter 11 will not be able to draw any more current until the activation button 33 is activated or manually reset, thus closing the switch 125 in the charging adapter 10. In other words, while the primary circuit 126 and 127 is interrupted, no current will be drawn by the power charger 11 until the primary circuit connection is restored by actuation or manual actuation of the button 33. Alternatively, the disconnection and then reconnection of the load 20 can trigger the reconnection or closing of the primary circuit.

Referring now to FIG. 12, there is shown an embodiment of the present invention, wherein charging adapter 10 includes an electronic switch, an electro-mechanical switch, an opto coupler or a mechanical switch 125 represented by the electro-mechanical switch/relay K1. More particularly, FIG. 12 is a partial circuit diagram for a charging adapter 10. Plug 23 connects charging adapter 10 to the mains 110 volt wall outlet 24 or other wall outlet 24 voltages, such as 220 volts. Plug 15 of power adapter 11 plugs into receptacle 25 of charging adapter 10. When switch 125 is closed, current flows directly from the power source or wall adapter 24 to power charger 11 through adapter 10 and through circuits 126 and 127. When switch 125 is opened, there is no longer any current flow from the wall socket 24 to power charger 11 and power charger 11 no longer draws current.

Charging adapter 10 also includes a connector or jack 31 for connection to a load 20, a first resistor R1, a second resistor R2, a transistor 130, a coil 135 which is a part of the relay K1. Transistor 130 is configured to operate as a solid-state switch that controls the state of the relay K1. Alternatively an opto-coupler may be used. For example, when current is being drawn by load 20, the transistor 130 is saturated and current flows through the coil 135, closing the relay contact 125 in the circuit 127. Please note that the use of a transistor 130 for the switch is not meant to be limiting, as the relay K1 can be controlled by another type of solid state switch or other similar electrical devices, such as, but not limited to, an FET switch, a zener diode or other switching logic devices including opto couplers.

The transformer in power charger 11 can be a high frequency transformer or a 60 cycle line voltage step down transformer from 110 volts on the primary coil to 5 to 6 volts alternating current at the secondary coil.

When the voltage is the same across resistor R1 and resistor R2 then at the Q1 junction of transistor 130 the emitter is on and current flows and magnetic coil 135 is energized, holding contact or switch 125 in a closed position allowing current flow in circuit 127 and current to flow to power charger 11. Coil 135 includes an internal spring that causes the switch 125 to open when current ceases to flow through coil 135. When switch 125 opens, the primary circuit 127 is interrupted and current no longer flows to power adapter 11, effectively disconnecting power adapter 11 from the mains. Current flows in the primary circuit 126 and 127 when plug 23 is connected to the mains and when switch or contact 125 is closed due to the relay coil 135 being energized. After the charging adapter is effectively disconnected from the mains, when switch 125 is open, to start current flow in charging adapter 10, plug 23 will be plugged into a power source (i.e., typically a household outlet such as a wall socket 24). With a load 20 attached to jack 31, with the jack 18 plugged into housing 35 of power adapter 11 and power charger 11 plugged into charging adapter 10 and charging adapter 10 plugged into a power source, the actuation or depression of manual switch 33 (i.e., a momentary switch, in the present example, corresponding to push button 33 of FIG. 1) is engaged with some force or actuation from a user which starts or allows current to flow through the charging adapter 10 to power charger 11. This will cause current to also flow through the secondary circuit of charger 11. With a load 20 attached to a connector or jack 31, current will flow to the load 20 and will saturate the solid state switch (i.e., transistor 130) and energizing the relay K1. Current flowing through coil 135 closes the contact or switch 125 and restores current flow through the circuit 127, even after momentary switch 33 has reopened.

Once current flows in the primary circuit and secondary-circuits have been restored, the transistor 130 will remain in saturation as long as the load 20 continues to be connected to the jack 31 and the plug 23 is connected to the mains, thus charging the load 20. Once the load device 20 stops drawing enough current to turn-on the transistor 130 (drops out of the circuit entirely), the transistor 130 turns off, current stops flowing through the transformer coils of the power adapter, the contact 125 opens and current flow through the primary circuit is interrupted until a load 20 is again attached and switch 33 is manually pressed.

Figure 13:
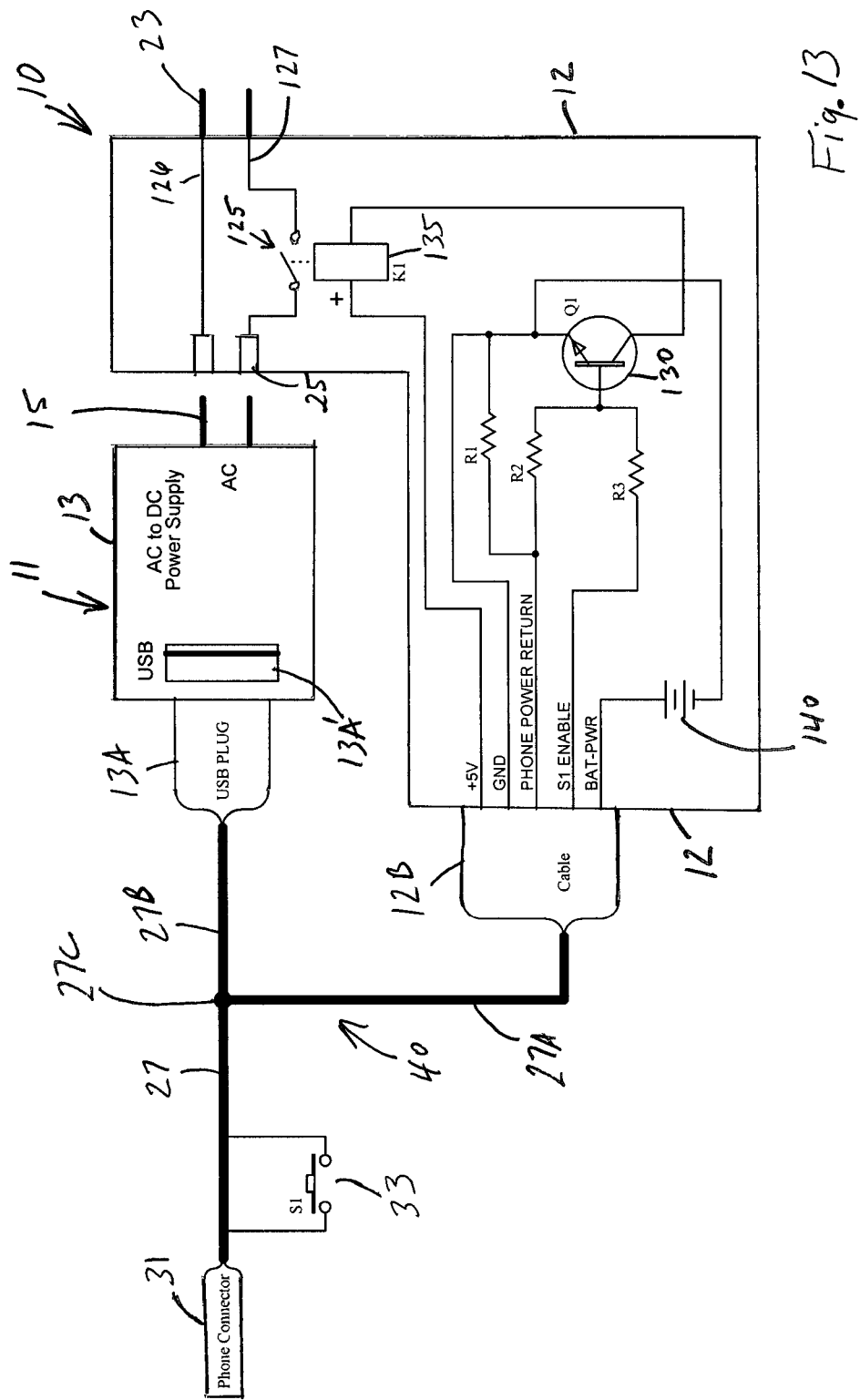
FIG. 13 is a variation of the circuit diagram in FIG. 12, showing an alternate embodiment of the present invention, specifically an adapter for use with a power charging device.

The circuit in FIG. 13 is substantially the same as FIG. 12 with the exception that the charging device 11 has a USB port at 13A' to receive a corresponding USB plug 13A as seen in FIGS. 15A, 15 B and 15C. A "Y" cable 40 includes USB connectors 13A, 12B, switch 33 and connector 31.

Referring to FIG. 12 typically for a cell phone, the charger 11 will include an interface data cable 17 that transfers power and may communicate data between the load 20 and the charger 11. As seen in FIGS. 12 and 13, interface data cables are identified as 17, 27, 27A, 27B, that communicate and carry data and power between the adapter 10, charger 11 and cell phone 20'. The ground GND is ground from the power supply 13. The phone 20'power return is similar to ground GND but is ground to the load 20 or phone 20'. Between GND and Phone Power Return is resister R1 which reflects a voltage across R1 based on current flow in the secondary circuit, where the secondary circuit is the circuit that provides current from the charger 11 to the load 20. R1 reflects current flow/voltage in the secondary circuit. When this secondary circuit current flow is zero or drops below a predetermined level, then Q1 of transistor 130 turns off which opens switch 125, when power is lost to the coil 135. Switch S1 (33) when actuated or enabled or closed provides power to turn on coil K1 and reenergizes the coil K1 by providing power to the top of transistor 130, Q1 which causes Q1 to provide current to the coil 135 and closes switch 125. It is possible that it may be desirable to include a circuit with an operational amplifier to better sense current to R1 (more robust) which input drives the Q1 switch. The battery 140 may be a hearing aid battery, a coin cell battery or triple AAA battery or any other type battery.

It is also being contemplated to use a protect diode between S1 and R3 to prevent charging of the batteries when coil 135 is energized and switch 125 is closed. When voltage rises R3 reverses bias and wouldn't discharge the battery as well.

As used herein, the transistor switch 130 may be replaced with an opto coupler which is a switch, an electronic switch which uses infrared coupling.

Referring to FIGS. 14A, 14B and 14C, in use, when it is desired to use the charging adapter 10 of the present invention on a charging device 11 the charging adapter 10 will essentially be placed at both ends of power charger 11. Plug 15 will be plugged into receptacle 25 of charger adapter 10 and jack 18 will be plugged into receptacle 29 of adapter housing 35. Receptacle 29 can alternatively be located in housing 12. Straps 28 can keep data cables 27 and 17 together. Once jack 31 is plugged into load 20 or phone 20' and plug 23 is plugged into wall socket 24, button 33 when depressed or activated will cause current to flow through adapter 10 to charger 11 causing battery 22 to charge. Once current to load 20 drops below a predetermined level or load 20 is disconnected from charger 11, switch 125 will open and current will no longer flow from the mains and the charger 11 will be effectively disconnected from the mains. To restart charging the above steps will be repeated.

More particularly, when load 20 is disconnected or there is a drop in current flow in the secondary circuit, sensed as a result of jack 18 connected to a data cable 27 at receptacle 29, that meets a threshold current level (i.e., below the turn-on threshold of the transistor 130) transistor 130 turns off, causing the magnetic coil 135 to lose power, and switch/contact 125 opens. When switch 125 opens there is no longer current flow in the primary circuit and power is no longer taken or drawn from the mains, though charging device 11 is still connected to the power source or plugged into the wall or other power source, there is no current flow in the primary circuit because switch 125 is open and the primary circuit has been effectively disconnected from the mains.

As discussed above, to reconnect the charging device 11 to the mains, switch 125 in primary circuit must be re-closed by restoring current flow in the primary circuit 127, via an actuation or manual actuation, required from a user, of button 33.

The charging device 10 shown in FIG. 12 has an activation switch 33 that is located at the point of use on the jack 31, at or near the distal end of the charger cord 17. Jack 31 which includes a housing 35 with a receptacle 29 to receive jack 18. Jack 31 is engaged or plugged into receptacle 21 with load 20 for example a cell phone 20' having a rechargeable battery 22. In this embodiment, the plug 23 can remain plugged into the mains. When the load 20 is disconnected from the connector 31 of the secondary circuit including cable 27, the transistor 130 turns off and the relay K1 is de-energized (i.e., current stops flowing through coil 135 and contact 125 opens). Thus, the primary circuit 127 is interrupted (i.e., opens) when switch 33 opens. As previously described the charging device 11 is effectively disconnected from the mains, though plug 23 remains plugged into the mains or wall socket 24.

In this present embodiment, the activation switch 33 is at the distal end of cord 27, but the power provided to the base of transistor 130 by the closing of the switch 33 is provided by a small battery 140, such as a hearing aid battery or other long life battery. This battery 140 can be located in the area of the jack 31, as part of the housing 35 or in the casing or housing 12 with the other electrical components of charger adapter 10. In this embodiment, when switch 33 is manually closed, the current in the battery 140 is provided to the base of the transistor switch 130, for a moment, momentarily energizing the coil 135 and initiating the closing of the switch 125. Once switch 125 is closed, current flow is restored through the primary circuit 127 and, consequently, through power adapter 11, despite the momentary switch 33 opening and the battery 140 dropping out of the circuit. Thus, power to the charging device 11 can be interrupted and restored without ever removing or reinserting the charging device 11 into the wall outlet 24 or mains.

In an alternate embodiment of the invention, the power applied to the circuit by manually closing the momentary switch 33 is provided by a rechargeable battery and can include a charging circuit for recharging the rechargeable battery when current flows through the power adapter 10. In this way, the rechargeable battery will have sufficient power at all times to turn-on transistor 130 and energize the coil 135 when switch 33 is activated or closed.

Further the present invention is a method for using a charging adapter for disconnecting a charging device having a transformer, primary circuit of the primary coil of the transformer; and opening a switch in the charging adapter when a current sensing device in the charging adapter determines there has been a decrease of current flow below a predetermined level, in the secondary circuit of the transformer of the charging device and manually actuating a switch in the charging adapter to permit current flow to the power adapter.

FIGS. 15A, 15B and 15C are substantially similar to FIGS. 14A, 14B and 14C except the data cable 40 replace the other data cable that came with the device to be charged. The Y cable has at one end a single jack 31 to plug into load at receptacle 21. The other two ends of data cable Y include USB 13A to plug directly into charging device 13 and the other end for plugging directly into any the adaptor 10. FIGS. 14A, 14B and 14C are represented by the circuit of FIG. 12 and FIGS. 15A, 15B and 15C are represented by the circuit of FIG. 13. FIGS. 14A, 14B and 14C and FIGS. 15A, 15B and 15C illustrate in perspective views the present invention used as an adapter 10 for an existing charging device 11 that does not have a switch to open or disconnect the charging device 11 from the mains.

Adapter 10 includes at one end of housing 12 a pair of prongs 23 to plug adapter 10 into the power source such as a wall socket 24. At the other end, adapter 10 includes a jack 31 to connect to the load 20 or phone 20'. In one such embodiment, as shown in FIG. 14A a charging device 11 has a housing 13 which would include a transformer having a primary circuit for connection to the mains and a secondary circuit having an A/C to D/C converter, a data cable and a jack 18 intended to be plugged into a load. Adapter 10 has a receptacle 25 to receive the prongs 15 of charging device 11. This allows the charging device 11 to extend the primary circuit through an extended primary circuit, 126 and 127 of FIGS. 12 and 13, to the wall receptacle 24. At the other end, jack 18 connects to receptacle 29 in adapter housing 35 which has an adapter jack 31 designed to be inserted into receptacle 21 of phone 20' to charge batteries 22.

The adaptor 10 shown in FIGS. 15A, 15B and 15C is substantially similar to FIG. 14A, 14B and 14C. However, as shown in FIGS. 15A, 15B and 15C a Y cable 40 is used to connect adaptor 10 to charging device 11 and to load 20 or phone 20'.

In these embodiments, adapter 10

Figures 16A, 16B:
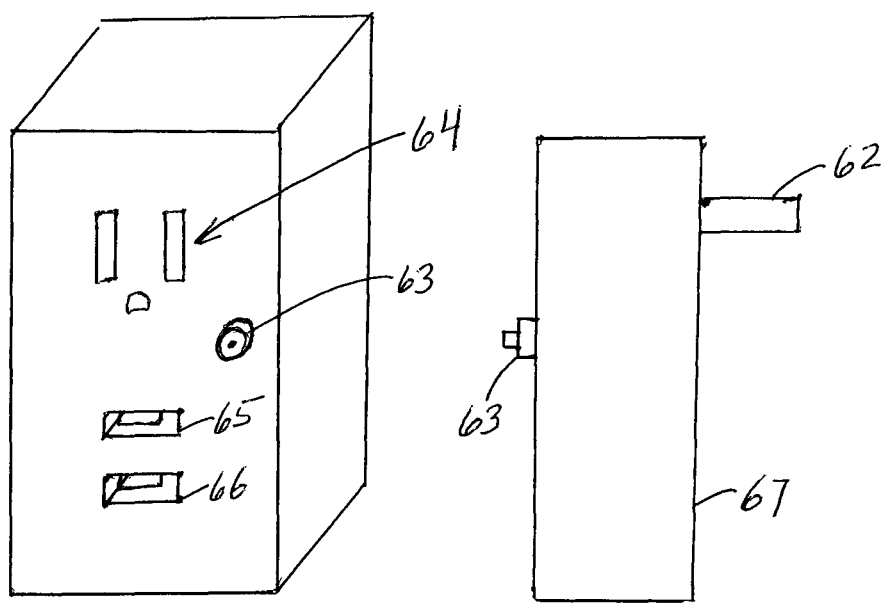
FIG. 16A is a perspective view of a wall socket assembly with a built in charging device for USB cables.
FIG. 16B is a side view of the wall socket assembly of FIG. 16A.

FIGS. 16A and 16B show a charging device 61 having a plug 62 to plug into a wall socket, an activating button 63, a typical electrical receptacle 64 and a pair of USB charging ports 65 and 66. This charging device 61 operates substantially as all others herein. Specifically the circuits discussed herein at FIGS. 4, 4A, 5, 6 and 6A are contained in housing or box 67 and is similar to the device shown in FIG. 1, and having an output in the form of a USB connector 65 and 66 to connect to the load.

Generally, the present invention includes a charging device having a plug for connecting the primary side of the charging device to a power source such as the mains and on the secondary side a jack for connection to any load such as a cell phone. Initially, the plug will be plugged into a wall outlet or other power source and the jack will be plugged into the load or cell phone and then the activation switch or button will be depressed in order to cause current to flow in the primary side transformer circuit of the charging device. When the load is charged or is disconnected, the current flow in the secondary side transformer circuit will drop down to a threshold level causing the switch in the primary circuit to open and the charging device will no longer draw power or current from the electrical source or mains. When it is desired to use the charging device again the above will be repeated. If the plug is still plugged in the wall then that step of plugging in the plug will not have to be repeated and if the load is still connected to the charging device, the plug will not have to be electrically attached again. However, the activation switch will be required to be activated or pressed in order to cause current to flow in the primary circuit again.

Further the present invention is a method for disconnecting a charging device including a transformer or similar circuit having a first primary side of the transformer connected to the mains or power source and a second secondary side of the transformer connected to a load to charge the load, having a first switch in the primary-side circuit of the primary coil of the transformer; and opening the first switch when a current sensing device determines there has been a change or decrease or cessation of current flow in the secondary-side circuit of the transformer, and manually actuating a second switch to close the first switch in the primary-side circuit in order to permit current flow in the primary-side circuit and to charge the load.

The present invention is also a charging device, having a transformer including a primary-side circuit and a secondary-side circuit, with the primary-side circuit including a first switch having an open state that opens said primary-side circuit to stop current flow and a closed state that permits current flow through said primary-side circuit, the secondary-side circuit including a connector for connection to a load for charging an energy storage device in said load, and a switching device in said secondary-side circuit for switching the first switch to its open state when the current drawn by said load is below a preset threshold.

Figure 17:
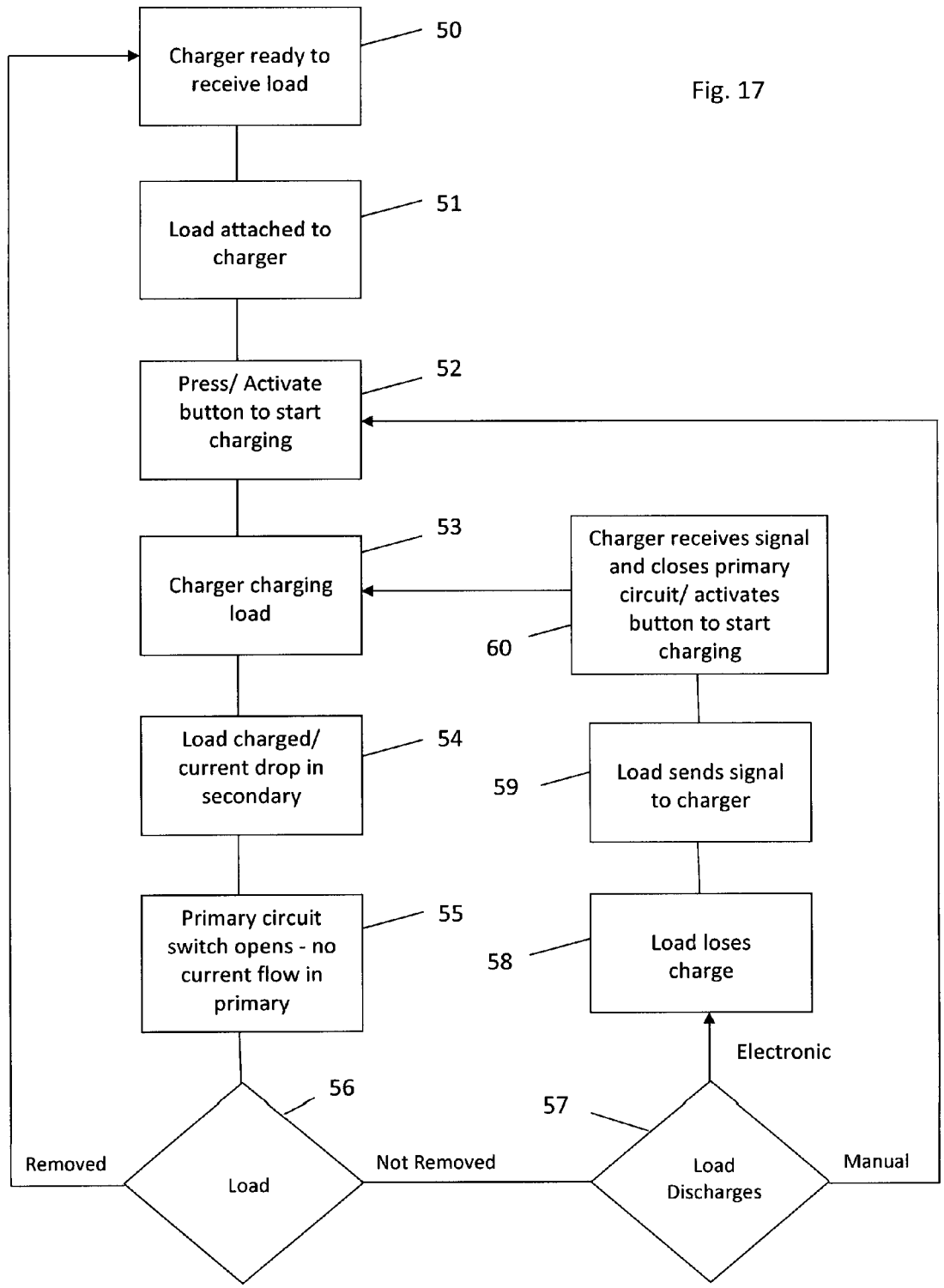
FIG. 17 is a flow chart showing the steps to connect a load and reconnect the load after the load is disconnected.

FIG. 17 is a flow chart showing certain steps of the present invention, where at block 50 the charging device is ready to receive a load. The load is attached to the charger at block 51. With the load attached to the charger, the activate button or switch at block 52 is activated causing the switch in the primary circuit to close, whether or not this switch in the primary circuit was previously closed. At block 53 the charger charges the load using power through the primary circuit and through the secondary circuit. At block 54, when the load is charged or the load is removed, there will be a current drop or change in the secondary circuit. At block 55, when the load is charged or if the load is removed, there is a change in the current flow in the secondary circuit, when this is detected, the primary side circuit switch will open and no more current will flow in the primary side circuit as the charger will be effectively disconnected from the mains. At block 56, if the load is removed or disconnected, the charger will then be ready to receive the load again at block 50. Alternatively if the load is not disconnected from the charging device, the load will discharge over time and at block 57 when the load discharges it can be recharged by manual activation with the activation button to start charging by returning to block 52 and the activation button will be activated to start charging. Alternatively at block 57 additional circuits can be provided such that when the load loses charge either the load can monitor the need for recharging or the charging device can measure the amount of charge left in the load at block 58. If the load sends a signal to the charger that it needs charging at block 59, then the charger will close the open switch in the primary circuit or activate the button to start charging at block 60 and the charger will again begin charging the load at block 53. Alternatively at block 60, the charging device can measure the power in the load and close the switch in the primary circuit to begin charging again. The variables for determining the power remaining in the load and when to begin recharging can be determined according to a load manufacturer's specifications and set accordingly in the algorithm at blocks 58 to 60.

Figure 18:
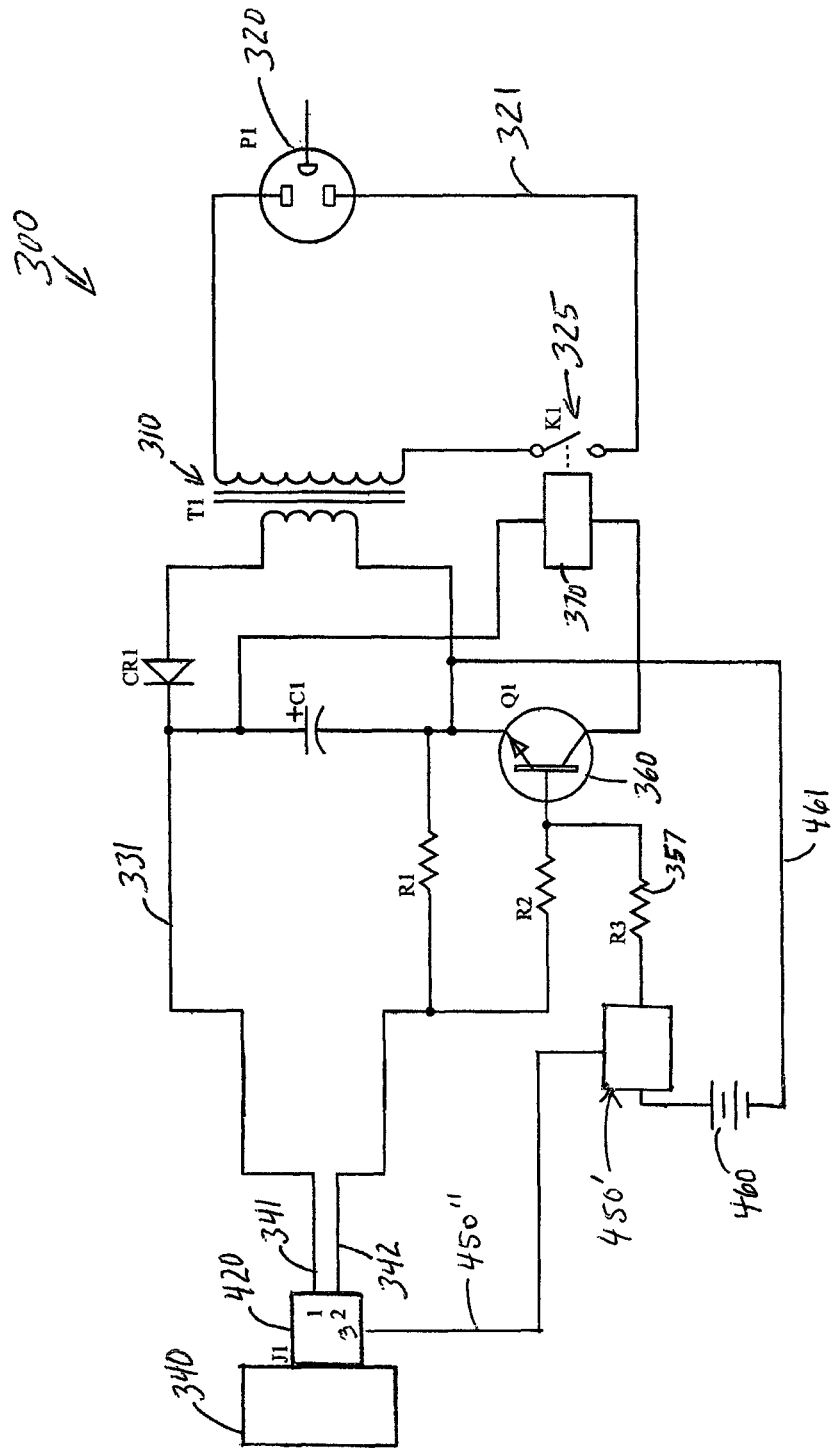
FIG. 18 is an alternate circuit diagram similar to FIG. 6 which includes feedback from the load and a logic circuit in the switch circuit to reconnect the primary circuit electronically without manual intervention.

Referring to FIG. 18 is a circuit diagram similar to FIG. 6. In this circuit, a switch logic circuit 450' includes an electronic switch powered by battery 460 to energize transistor 360 which as previously discussed closes switch 325 in primary circuit 321. A feedback circuit 450" connects the load to the switch logic circuit 450'. Feedback circuit 450" communicates information about the load 340 including the status of the battery in the load including the amount of charge left in the battery in the load 340. When the load 340 remains connected to charging device 300 after the load 340 is charged, though the primary switch 325 is opened so that there is no current draw from the mains, the battery in load 340 will discharge and the battery in load 340 will lose its charge. Logic circuit 450' will monitor the power left in the battery in load 340. When the battery in load 340 reaches a predetermined level, logic circuit 450' will actuate the switch circuit 450' to energize transistor 360 and close switch 325 as described herein. With the primary circuit 321 connected, the load will be charged and the charging cycle will repeat itself. When the current drops in the secondary circuit 331 switch 325 will again be opened and logic circuit 450' will continue to monitor the load 340 battery until it reaches a level requiring more charging. With the load 340 remaining connected to the charger 300, the battery in load 340 can discharge for several reasons not within the scope of this patent, though it could discharge based on use of the load, or no use of the load where the battery over time will discharge.

The present invention includes a method for disconnecting a charging device including a transformer, and providing a first switch in the primary-side circuit of the primary coil of the transformer; and opening the switch when a current sensing device determines a decrease of current flow in the secondary-side circuit of the transformer, and manually actuating a switch to permit current flow in the primary-side circuit. And, wherein the switch in the manually actuating step is the first switch. And wherein the first switch is part of a relay or other electromechanical switch. And wherein the first switch is a relay contact in the primary-side circuit closed by a relay coil in the secondary-side circuit that is energized when a solid state switching device is turned-on. And wherein the switch in the manually actuating step is a momentary switch different from the first switch. And wherein the switch in the manually actuating step is a fluid pusher using a fluidic force to close the first switch. And wherein the switch in the manually actuating step is disposed in the primary-side circuit of the transformer. And wherein the switch in the manually actuating step is disposed in the secondary-side circuit of the transformer. And wherein said secondary-side circuit includes a battery that provides power to initiate closing of the first switch when the switch in the manually actuating step is closed.

The present invention includes a charging device, having a transformer including a primary-side circuit and a secondary-side circuit; the primary-side circuit including a first switch having an open state that opens said primary-side circuit to current flow and a closed state that permits current flow through said primary-side circuit; the secondary-side circuit including a connector for connection to a load for charging an energy storage device in said load; a switching device in said secondary-side circuit for switching the first switch to its open state when the current drawn by said load is below a preset threshold. And wherein the first switch is part of a relay or other electromechanical switch. And wherein the first switch is a relay contact in the primary-side circuit closed by a relay coil in the secondary-side circuit that is energized when a solid state switching device is turned-on. And wherein the switch in the manual switch is a momentary switch different from the first switch. And wherein the manual switch is a fluid pusher using a fluidic force to close the first switch. And wherein the manual switch is disposed in the primary-side circuit of the transformer. And wherein the manual switch is disposed in the secondary-side circuit of the transformer. And wherein said secondary-side circuit includes a battery that provides power to initiate closing of the first switch when the manual switch is closed. And wherein the manual switch is a momentary switch that restores current flow in the primary-side circuit. And wherein the manual switch temporarily provides power to a solid state switching device in the secondary-side circuit to cause said first switch to close and restore current flow to both said primary-side and secondary-side circuits. And wherein the first switch is a contact of a relay, an energizing coil of said relay being disposed in said secondary-side circuit, and said solid state switching device is a transistor that, when switched on, energizes said energizing coil to close said contact.

The present invention is a charging device, having a mechanical switch located in the circuit of a primary coil of a transformer used in the charging device; and a current sensing device for monitoring the current drawn from a secondary coil of the transformer, the switch being opened when the current sensing device determines that no current is being drawn from the secondary coil, and is a method for disconnecting a charging device, providing a mechanical switch located in the circuit of the primary coil of a transformer used in the charging device; and opening the mechanical switch when the current sensing device determines that no current is being drawn from the secondary coil, and manually actuating said mechanical switch to permit current flow.

The present invention is a charging device, having a connector for connection to a load, the connector receiving a current from a charger circuit; the charger circuit including a transformer and a mechanical switch located in the circuit of a primary coil of the transformer; and a current sensing device for monitoring the current drawn from the connector, the switch being opened when the current sensing device determines that the current being drawn from the connector is below a predetermined level, and wherein said mechanical switch is configured to require manual actuation to permit current flow, and wherein said manual actuation is by an actuator button wherein said manual actuation is by connection of a cell phone to said secondary coil, and wherein said mechanical switch is configured to require manual actuation to close said mechanical switch and permit current flow, and wherein said manual actuation is by an actuator button, and wherein said manual actuation is by connection of a load to said connector, and wherein said load is a cell phone.

The above-described embodiments are exemplary and that the above invention is not meant to be limited only to its preferred embodiments. It can be seen that other modifications can be made to the preferred embodiments and still be within the spirit of the present invention.

We claim:

1. A charging device, comprising:
   a transformer including a primary-side circuit and a secondary-side circuit;
   the primary-side circuit including a first switch having an open state that opens said primary-side circuit to current flow and a closed state that permits current flow through said primary-side circuit;
   the secondary-side circuit including a connector for connection to a load for charging an energy storage device in said load;
   a second switch in said secondary-side circuit for switching the first switch to its open state when the current drawn by said load is below a preset threshold.

2. An adapter for a charging device having a transformer including a primary-side circuit and a secondary-side circuit, comprising:
   a first adapter portion for extending the primary-side circuit of said charging device including a first switch having an open state that opens said extended primary-side circuit to current flow and a closed state that permits current flow through said extended primary-side circuit;
   a second adapter portion for extending the secondary-side circuit of said charging device including a connector for connection to a load for charging an energy storage device in said load;
   a second switch in said extended secondary-side circuit for switching the first switch to its open state when the current drawn by said load is below a preset threshold.

3. The charging device of claim 1, wherein the first switch is part of a relay or other electromechanical switch.

4. The charging device of claim 1, wherein the first switch is a relay contact in the primary-side circuit closed by a relay coil in the secondary-side circuit that is energized when a solid state switching device is turned-on.

5. The charging device of claim 1, wherein said secondary-side circuit includes a battery that provides power to initiate closing of the first switch when the second switch is closed.

6. The charging device of claim 1 wherein said second switch is activated based on feedback from the battery in the load.

7. A method for disconnecting a charging device including a transformer, comprising:
   providing a first switch in the primary-side circuit of the primary coil of the transformer;
   providing a second switch in the secondary-side circuit of the transformer; and
   the second switch switching the first switch to its open state when a current drawn by a load connected to the secondary-side circuit is below a preset threshold.

8. The method of claim 7, wherein the second switch is actuated to close the first switch and permit current flow in the primary-side circuit.

9. The method of claim 7, wherein the first switch is part of a relay or other electromechanical switch.

10. The method of claim 8, wherein the secondary-side circuit includes a battery that provides power to initiate closing of the first switch when the second switch in the actuating step is closed.

11. The method of claim 7, wherein the second switch includes a solid-state switching device.

12. The method of claim 11, wherein the first switch is a relay contact in the primary-side circuit closed by a relay coil in the secondary-side circuit that is energized when the solid state switching device is turned-on.

13. The method of claim 8, further comprising the step of activating the second switch to close the first switch based on feedback about the battery in the load.

14. The method of claim 7, further comprising the steps of:
- monitoring, with the load connected to the secondary-side circuit, a battery level of the load; and
- sending, by the load, a signal to the secondary-side circuit to close the first switch when the battery level of the load drops below a predetermined level.

* * * * *